US012675649B2

(12) United States Patent
Tiwari et al.

(10) Patent No.: US 12,675,649 B2
(45) Date of Patent: Jul. 7, 2026

(54) CONTEXTUALIZED OUTPUT RELIABILITY EVALUATION FOR LANGUAGE MODELS

(71) Applicant: MCKINSEY & COMPANY, INC., New York, NY (US)

(72) Inventors: Siddharth Tiwari, Tempe, AZ (US); Francisco Reveriano, Austin, TX (US); Vikramsinh Sohoni, Chicago, IL (US)

(73) Assignee: MCKINSEY & COMPANY, INC., New York, NY (US)

( * ) Notice: Subject to any disclaimer, the term of this patent is extended or adjusted under 35 U.S.C. 154(b) by 0 days.

(21) Appl. No.: 18/900,485

(22) Filed: Sep. 27, 2024

(65) Prior Publication Data

US 2026/0093931 A1 Apr. 2, 2026

(51) Int. Cl.

| | |
|---|---|
| ***G06F 40/30*** | (2020.01) |
| ***G06F 18/241*** | (2023.01) |
| ***G06F 40/289*** | (2020.01) |
| ***G06F 40/40*** | (2020.01) |

(52) U.S. Cl.

CPC ............ *G06F 40/40* (2020.01); *G06F 18/241* (2023.01); *G06F 40/289* (2020.01); *G06F 40/30* (2020.01)

(58) Field of Classification Search

CPC .... G06F 40/211; G06F 40/253; G06F 40/268; G06F 40/284; G06F 40/30

See application file for complete search history.

(56) References Cited

U.S. PATENT DOCUMENTS 9,787,705 B1 * 10/2017 Love .................. G06F 16/9024
9,836,183 B1 * 12/2017 Love .................... G06F 16/904
11,238,522 B1 * 2/2022 Subramanian ..... G06Q 30/0639
11,321,629 B1 * 5/2022 Rowan ................... G06N 20/00
11,461,841 B2 * 10/2022 Way ....................... G06N 20/00
11,501,378 B2 * 11/2022 Gulati .................... G06Q 40/02
11,538,112 B1 * 12/2022 Singh ..................... G06Q 10/10
11,972,223 B1 * 4/2024 DeFoor ................... G06F 40/35
12,271,696 B1 * 4/2025 Galvin .................. G06F 40/242
2015/0254555 A1 * 9/2015 Williams, Jr. ......... G06N 3/045 706/14
2018/0336183 A1 * 11/2018 Lee ........................ G06N 5/022
2019/0005198 A1 * 1/2019 Richards ................ G06Q 10/10
2019/0012566 A1 * 1/2019 Kumagai .......... G06F 18/24765
2019/0087395 A1 * 3/2019 Priestas ................. G06F 40/169

(Continued)

OTHER PUBLICATIONS

Tonmoy et al., title={A comprehensive survey of hallucination mitigation techniques in large language models}, journal={arXiv preprint arXiv:2401.01313}, pp. 1-20, Jan. 2024 (Year: 2024).*

(Continued)

*Primary Examiner* — Lamont M Spooner

(74) *Attorney, Agent, or Firm* — MARSHALL, GERSTEIN & BORUN LLP

(57) ABSTRACT

A method of evaluating the reliability of a response generated by a language model is described herein. The method includes obtaining a query provided to a language model and a response to the query generated by the language model, and applying hallucination evaluation techniques to one or more of the query and the response to generate hallucination scores. The method also includes combining the hallucination scores to obtain a confidence score, and providing an indication of the confidence score for display on a user interface, where the confidence score indicates the reliability of the response.

19 Claims, 7 Drawing Sheets

| | 502 | 504 | 506 | 508 | 510 | 512 | 514 | 516 | 518 | 520 | 522 |
|---|---|---|---|---|---|---|---|---|---|---|---|
| | Query | Response | QCT | NFE | SCM | CRA | QRDE | RAGAs | MERT | Confidence Score | Reliability |
| 530 | What is the capital city of France? | The capital of France is Paris | .6 | .95 | .7 | .55 | .8 | .75 | .72 | .9 | High |
| 532 | Does a goldfish have a 3-second memory? | Goldfish actually have a memory span of months and can learn and remember things quite well | .65 | .71 | .75 | .69 | .81 | .79 | .82 | .80 | Medium |
| 534 | How many planets are there in our solar system? | There are 9 planets in our solar system. They are Earth, Mars, Jupiter, Saturn, Uranus, Neptune, Venus, Mercury, and Pluto | .3 | .12 | .21 | .19 | .13 | .21 | .14 | .19 | Low |

(56) References Cited

U.S. PATENT DOCUMENTS

| | | | | |
|---|---|---|---|---|
| 2019/0287685 | A1* | 9/2019 | Wu | G06F 40/295 |
| 2019/0378050 | A1* | 12/2019 | Edkin | G06N 20/20 |
| 2019/0392441 | A1* | 12/2019 | Lee | G06N 20/00 |
| 2020/0074515 | A1* | 3/2020 | Ghatage | G06F 40/58 |
| 2020/0075166 | A1* | 3/2020 | Gleason | G06F 16/258 |
| 2020/0097301 | A1* | 3/2020 | Pasala | G06N 3/08 |
| 2020/0143277 | A1* | 5/2020 | Levine | G06Q 10/08 |
| 2020/0364404 | A1* | 11/2020 | Priestas | G06V 30/19173 |
| 2021/0201328 | A1* | 7/2021 | Gunther | H04L 9/3073 |
| 2021/0286833 | A1* | 9/2021 | Verstraete | G06Q 10/10 |
| 2021/0342716 | A1* | 11/2021 | Adel-Vu | G06N 5/04 |
| 2022/0044328 | A1* | 2/2022 | Ligon | G16H 10/60 |
| 2023/0135769 | A1* | 5/2023 | Bhattacharya | G06N 3/088<br>345/156 |
| 2024/0119220 | A1* | 4/2024 | Aggarwal | G06N 3/08 |
| 2024/0184988 | A1* | 6/2024 | Sridhar | G06F 16/36 |
| 2024/0320251 | A1* | 9/2024 | Hemington | G06F 16/35 |
| 2024/0330661 | A1* | 10/2024 | Rahman | G06N 3/044 |
| 2024/0330755 | A1* | 10/2024 | Kumar | G06N 20/00 |
| 2024/0338554 | A1* | 10/2024 | Schmidt | G06N 3/045 |
| 2024/0370769 | A1* | 11/2024 | Sheth | G06N 20/00 |
| 2024/0386253 | A1* | 11/2024 | White, Jr. | G06F 40/166 |
| 2024/0419912 | A1* | 12/2024 | Somech | G06N 3/044 |
| 2025/0005301 | A1* | 1/2025 | DeFoor | G06F 40/35 |
| 2025/0077940 | A1* | 3/2025 | Cui | G06N 20/00 |
| 2025/0298821 | A1* | 9/2025 | Yu | G06F 16/3344 |
| 2025/0315684 | A1* | 10/2025 | Watson | G06N 3/044 |
| 2025/0384431 | A1* | 12/2025 | Rudraraju | G06Q 20/085 |
| 2026/0003988 | A1* | 1/2026 | Vora | G06F 21/6218 |
| 2026/0023787 | A1* | 1/2026 | McVeigh | G06F 16/90332 |

OTHER PUBLICATIONS

Huang et al., title={A survey on hallucination in large language models: Principles, taxonomy, challenges, and open questions}, journal={ACM Transactions on Information Systems}, publisher={ACM New York, NY}, pp. 1-54, (Year: 2023).*

Li et al., title={Enhancing llm factual accuracy with rag to counter hallucinations: A case study on domain-specific queries in private knowledge-bases}, journal={arXiv preprint arXiv:2403.10446}, Mar. 2024, pp. 1-10 (Year: 2024).*

Valentin et al., title={Cost-effective hallucination detection for llms}, journal={arXiv preprint arXiv:2407.21424}, Aug. 9, 2024, pp. 1-17 (Year: 2024).*

Darapaneni et al., title={Building a Question and Answer System for News Domain}, journal={arXiv preprint arXiv:2105.05744}, 2021, pp. 1-6 (Year: 2021).*

Pandey et al., title={Mix-and-Match: Scalable Dialog Response Retrieval using Gaussian Mixture Embeddings}, journal={arXivpreprint arXiv:2204.02710}, pp. 1-11, (Year: 2022).*

R. B.-Y. a. B. Ribeiro-Neto, "Modern Information Retrieval,", *ACM* Press, 1999.

G. Salton and C. Buckley, "Term-weighting approaches in automatic text retrieval," *Information Processing & Management*, vol. 24, No. 55, 1988.

Y. Jian and L. Torresani, "Label hallucination for few-shot classification.," *Proceedings of the AAA/Conference on Artificial Intelligence.*, vol. 36, No. 6, 2022.

S. Es, J. James, L. Espinosa-Anke and S. Schockaert, "RAGAS: Automated Evaluation of Retrieval Augmented Generation," *arXiv preprint arXiv*:2309.15217, 2023.

T. Mikolov, C. Kai, G. Corrado and J. Dean, "Efficient estimation of word representations in vector space," *arXiv preprint arXiv*:1301. 3781 , 2013.

D. Nadeau and S. Sekine, "A survey of named entity recognition and classification," *Lingvisticæ Investigationes*, vol. 30, No. 1, 2007.

M. J. Kusner, Y. Sun, N. I. Kolkin and K. Q. Weinberger, "From word embeddings to document distances," *ICML'15: Proceedings of the 32nd International Conference on International Conference on Machine Learning*, vol. 37, pp. 957-966, 2015.

2001A. Singhal, "Modern information retrieval: A brief overview.," *IEEE Data Eng. Bull.*, vol. 24, No. 4.

David M. Blei, A. Y. Ng. and M. I. Jordan, "Latent dirichlet allocation.," *Journal of machine Learning research*, No. 3, pp. 9993-1022, 2003.

* cited by examiner

| | 502 | 504 | 506 | 508 | 510 | 512 | 514 | 516 | 518 | 520 | 522 |
|---|---|---|---|---|---|---|---|---|---|---|---|
| | Query | Response | QCT | NFE | SCM | CRA | QRDE | RAGAs | MERT | Confidence Score | Reliability |
| 530 | What is the capital city of France? | The capital of France is Paris | .6 | .95 | .7 | .55 | .8 | .75 | .72 | .9 | High |
| 532 | Does a goldfish have a 3-second memory? | Goldfish actually have a memory span of months and can learn and remember things quite well | .65 | .71 | .75 | .69 | .81 | .79 | .82 | .80 | Medium |
| 534 | How many planets are there in our solar system? | There are 9 planets in our solar system. They are Earth, Mars, Jupiter, Saturn, Uranus, Neptune, Venus, Mercury, and Pluto | .3 | .12 | .21 | .19 | .13 | .21 | .14 | .19 | Low |

START

OBTAIN A QUERY PROVIDED TO THE LANGUAGE
MODEL AND THE RESPONSE TO THE QUERY
GENERATED BY THE LANGUAGE MODEL — 602

APPLY A PLURALITY OF HALLUCINATION EVALUATION
TECHNIQUES TO ONE OR MORE OF THE QUERY
AND THE RESPONSE TO GENERATE A PLURALITY
OF HALLUCINATION SCORES — 604

COMBINE THE PLURALITY OF HALLUCINATION
SCORES TO OBTAIN A CONFIDENCE SCORE — 606

PROVIDE AN INDICATION OF THE CONFIDENCE
SCORE FOR DISPLAY ON A USER INTERFACE,
WHEREIN THE CONFIDENCE SCORE INDICATES
THE RELIABILITY OF THE RESPONSE — 608

END

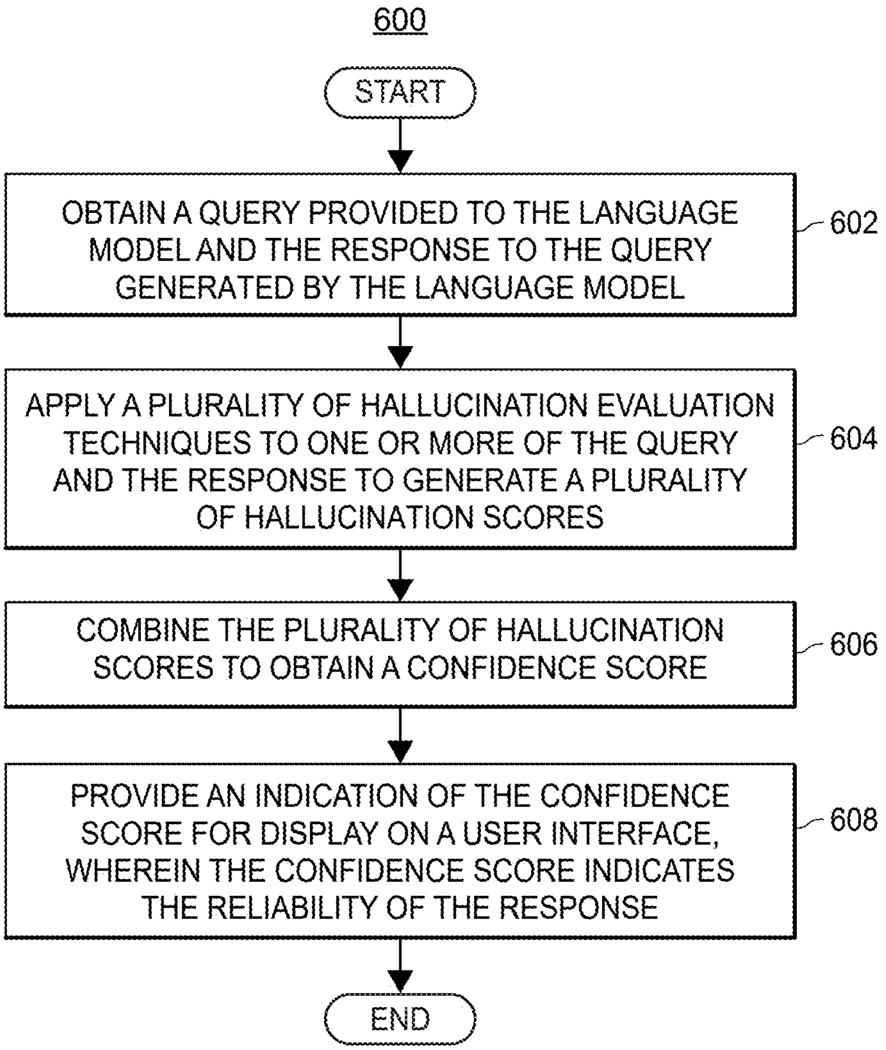

FIG. 6

CONTEXTUALIZED OUTPUT RELIABILITY EVALUATION FOR LANGUAGE MODELS

FIELD OF THE DISCLOSURE

The present disclosure relates to machine learning and, more particularly, to evaluating the reliability of a response generated by a language model.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Hallucinations in machine learning models (e.g., language models) refer to situations where the machine learning models generate content that appears coherent and plausible but is factually incorrect or completely fabricated. With the advent of artificial intelligence and machine learning models, hallucinations have become increasingly problematic as more and more users are beginning to use these machine learning models that often output incorrect responses.

However, there are significant challenges to assessing the relevance and reliability of responses generated by machine learning models.

SUMMARY

In some aspects, the techniques described herein relate to a method for evaluating reliability of a response generated by a language model, the method including: obtaining, by one or more processors, a query provided to a language model and a response to the query generated by the language model; applying, by the one or more processors, a plurality of hallucination evaluation techniques to one or more of the query and the response to generate a plurality of hallucination scores; combining, by the one or more processors, the plurality of hallucination scores to obtain a confidence score; and providing, by the one or more processors, an indication of the confidence score for display on a user interface, wherein the confidence score indicates the reliability of the response.

In some aspects, the techniques described herein relate to a method, wherein the plurality of hallucination evaluation techniques include two or more of: (i) a query classification technique, (ii) a numerical and factual evaluation, (iii) semantic context matching, (iv) a chunk relatedness assessment, (v) a query-response distance evaluation, (vi) retrieval augmented generation assessment (RAGAs), and (vii) a multi-embedding robustness technique.

In some aspects, the techniques described herein relate to a method, wherein applying the query classification technique includes: training, by the one or more processors, a query classification model using a first set of queries that result in hallucinations and a second set of queries that do not result in hallucinations; and applying, by the one or more processors, the query to the query classification model to determine a probabilistic score based on a probability of the response to the query having a hallucination.

In some aspects, the techniques described herein relate to a method, wherein applying the numerical and factual evaluation includes: identifying, by the one or more processors, numerical or factual information within the response including, for each instance of the numerical or factual information in the response, identifying a type of the numerical or factual information and identifying a first value for the numerical or factual information; obtaining, by the one or more processors, a second value for each identified type of the numerical or factual information from a database; and comparing, by the one or more processors, for each identified type of the numerical or factual information, the first value in the response to the second value in the database to determine a factual validation score.

In some aspects, the techniques described herein relate to a method, wherein applying the semantic context matching includes: dividing, by the one or more processors, the response into a plurality of chunks; for each chunk in the plurality of chunks, analyzing, by the one or more processors, the chunk to identify a semantic context for the chunk; analyzing, by the one or more processors, the query to identify a semantic context for the query; comparing, by the one or more processors, the semantic contexts for each chunk to the semantic context for the query; and determining, by the one or more processors, a semantic context matching score based on differences between the semantic contexts for each of the plurality of chunks and the semantic context for the query.

In some aspects, the techniques described herein relate to a method, wherein applying the chunk relatedness assessment includes: dividing, by the one or more processors, the response into a plurality of chunks; for each of the plurality of chunks, applying, by the one or more processors, a topic modeling algorithm to the chunk to identify a topic for the chunk; for each pair of chunks in the plurality of chunks, determining, by the one or more processors, a topic coherence score for the pair based on the topics; and determining, by the one or more processors, a chunk relatedness score based on the topic coherences score for each pair of chunks.

In some aspects, the techniques described herein relate to a method, wherein applying the query-response distance evaluation includes: converting, by the one or more processors, the query and the response into a query vector and a response vector; determining, by the one or more processors, a minimum distance between the query vector and the response vector based on the minimum distance required to transform the query vector to the response vector; and determining, by the one or more processors, a query-response distance score based on the minimum distance.

In some aspects, the techniques described herein relate to a method, wherein applying the RAGAs includes: obtaining, by the one or more processors, a context for the query; determining, by the one or more processors, a faithfulness score based on a number of statements in the response that are supported by the context; generating, by the one or more processors, one or more potential questions corresponding to the response; determining, by the one or more processors, a relevance score based on one or more differences between the one or more potential questions and the query; extracting, by the one or more processors, a number of relevant sentences from the context which are relevant to the query; determining, by the one or more processors, a context relevance score based on the number of relevant sentences compared to a total number of sentences in the context; and determining, by the one or more processors, a RAGAs score based on the faithfulness score, the relevance score, and the context relevance score.

In some aspects, the techniques described herein relate to a method, wherein applying the multi-embedding robustness technique includes: obtaining, by the one or more processors, a context for the query; for each word embedding model of a plurality of word embedding models: converting, by the one or more processors, the context and the response into a context vector and a response vector using the word embedding model; and determining, by the one or more processors, a difference between the context vector and the response vector using the word embedding model; and combining, by the one or more processors, the differences between the context vectors and the response vectors obtained from each word embedding model to generate a multi-embedding score.

In some aspects, the techniques described herein relate to a method, wherein combining the plurality of hallucination scores to obtain the confidence score includes: combining, by the one or more processors, (i) a probabilistic score using the query classification technique, (ii) a factual validation score using the numerical and factual evaluation, (iii) a semantic context matching score using the semantic context matching technique, (iv) a chunk relatedness score using the chunk relatedness assessment, (v) a query-response distance score using the query-response distance evaluation, (vi) a RAGAs score using the RAGAs technique, and (vii) a multi-embedding score using the multi-embedding robustness technique.

In some aspects, the techniques described herein relate to a method, wherein combining the plurality of hallucination scores to obtain the confidence score includes: applying, by the one or more processors, the plurality of hallucination scores to a probabilistic model to obtain the confidence score.

In some aspects, the techniques described herein relate to a method, further including: determining, by the one or more processors, that one of the plurality of hallucination scores is above a hallucination score threshold; and in response to determining that the hallucination score is above the hallucination score threshold, determining, by the one or more processors, the confidence score without performing remaining hallucination evaluation techniques of the plurality of hallucination evaluation techniques.

In some aspects, the techniques described herein relate to a method, further including: in response to determining that the confidence score is below a threshold score, providing, by the one or more processors, the query to the language model for the language model to reevaluate the query and generate a new response.

In some aspects, the techniques described herein relate to a method, further including: training, by the one or more processors, the language model using the confidence score.

In some aspects, the techniques described herein relate to a computer system for evaluating reliability of a response generated by a language model including: one or more processors, and a non-transitory program memory coupled to the one or more processors and storing executable instructions that, when executed by the one or more processors, causes the computer system to: obtain a query provided to the language model and the response to the query generated by the language model; apply a plurality of hallucination evaluation techniques to one or more of the query and the response to generate a plurality of hallucination scores; combine the plurality of hallucination scores to obtain a confidence score; and provide an indication of the confidence score for display on a user interface, wherein the confidence score indicates the reliability of the response.

In some aspects, the techniques described herein relate to a computer system, wherein the plurality of hallucination evaluation techniques includes two or more of: (i) a query classification technique, (ii) a numerical and factual evaluation, (iii) semantic context matching, (iv) a chunk relatedness assessment, (v) a query-response distance evaluation, (vi) retrieval augmented generation assessment (RAGAs), and (vii) a multi-embedding robustness technique.

In some aspects, the techniques described herein relate to a computer system, wherein the instructions, when executed by the one or more processors, further cause the computer system to: determine that one of the plurality of hallucination scores is above a hallucination score threshold; and in response to determining that the hallucination score is above the hallucination score threshold, determine the confidence score without performing remaining hallucination evaluation techniques of the plurality of hallucination evaluation techniques.

In some aspects, the techniques described herein relate to a computer system, wherein the instructions, when executed by the one or more processors, further cause the computer system to: in response to determining that the confidence score is below a threshold score, provide the query to the language model for the language model to reevaluate the query and generate a new response.

In some aspects, the techniques described herein relate to a computer system, wherein the instructions, when executed by the one or more processors, further cause the computer system to: train the language model using the confidence score.

In some aspects, the techniques described herein relate to a non-transitory computer-readable medium storing executable instructions for evaluating reliability of a response generated by a language model, the instructions, when executed by one or more processors, cause the one or more processors to: obtain a query provided to the language model and the response to the query generated by the language model; apply a plurality of hallucination evaluation techniques to one or more of the query and the response to generate a plurality of hallucination scores; combine the plurality of hallucination scores to obtain a confidence score; and provide an indication of the confidence score for display on a user interface, wherein the confidence score indicates the reliability of the response.

BRIEF DESCRIPTION OF THE DRAWINGS

FIG. 5 illustrates an example data table including hallucination scores from multiple hallucination evaluation techniques used to evaluate a response from a language model, a confidence score, and an indication of the reliability of the response;

FIG. 6 is a flow diagram of an example method for evaluating the reliability of a response generated by a language model, which may be implemented in a server device.

DETAILED DESCRIPTION

Figure 1:
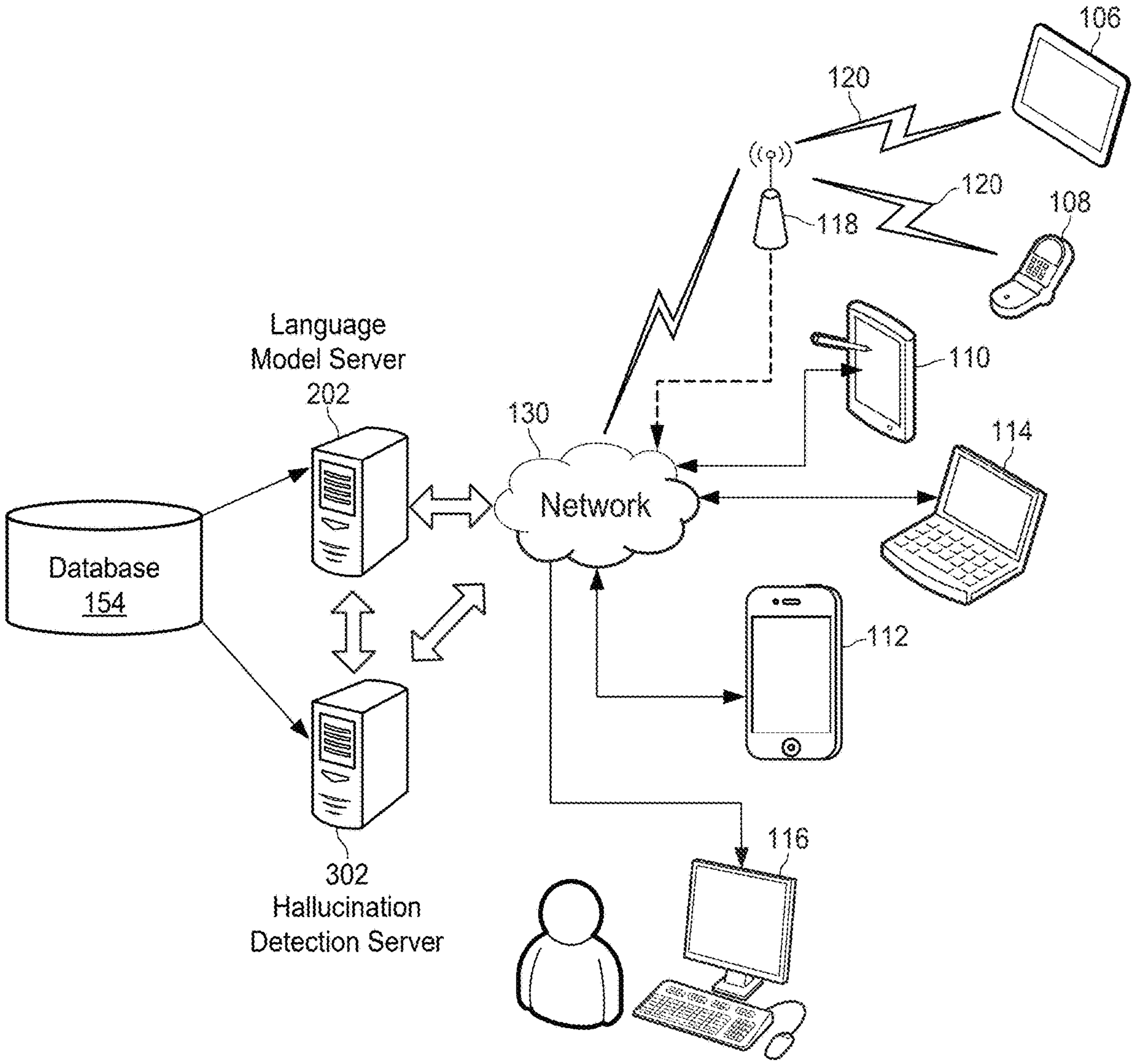
FIG. 1 illustrates a block diagram of an example communication system in which a method for evaluating the reliability of a response generated by a language model can be implemented.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Broadly speaking, the techniques of the present disclosure relate to a comprehensive hallucination evaluation system for evaluating the reliability of a response generated by a language model by using multiple hallucination evaluation techniques to determine a confidence score indicating a confidence level of the factual accuracy of the response. The comprehensive hallucination evaluation system utilizes both preventative and detective measures to evaluate hallucinations. In this manner, the comprehensive hallucination evaluation system determines the likelihood that the response generated by the language model is a hallucination based on the confidence score. By using multiple hallucination evaluation techniques and combining them, the comprehensive hallucination evaluation system improves the accuracy and reliability of detecting hallucinations in a response. Accordingly, the comprehensive hallucination evaluation provides a detailed and precise evaluation of the response, enabling users to gauge the trustworthiness of the information.

The comprehensive hallucination evaluation system evaluates responses across several dimensions: numerical and factual validation, semantic context matching, chunk relatedness, faithfulness to the context, relevance to the query, relevance to the context, and/or query-response distance. Furthermore, the comprehensive hallucination evaluation system preventatively checks the hallucinatory risk of the query.

Alternative systems do not combine multiple hallucination evaluation techniques to obtain a confidence score and do not use the confidence score to indicate the reliability of the response. These alternative techniques therefore experience significant issues, such as inaccuracy in detecting hallucinations. For example, an alternative technique such as using heuristic filters to filter out rare words or phrases that are unlikely to appear in factual responses may be efficient in detecting hallucinations, but oftentimes inaccurate.

By contrast, the comprehensive hallucination evaluation system overcomes these challenges, and therefore provides multiple technical advantages over such alternative techniques. For example, by incorporating multiple hallucination evaluation techniques to generate multiple hallucination scores, which are then combined to obtain a confidence score, the comprehensive hallucination evaluation system more accurately detects whether the response includes a hallucination. Even if one hallucination evaluation technique does not identify a hallucination in the response, other hallucination evaluation techniques may detect the hallucination. As a result, the confidence score based on multiple hallucination evaluation techniques may more accurately reflect whether the response is hallucination.

Moreover, each hallucination evaluation technique may focus on a different part of the language model for detecting a hallucination. For example, one hallucination evaluation technique may focus on the query, another hallucination evaluation technique may focus on the context of the response, and another hallucination evaluation technique may focus on the response to detect whether the response includes a hallucination. This allows the comprehensive hallucination evaluation system to use both preventative and detective measures to detect a hallucination. Therefore, by combining multiple hallucination evaluation techniques, the present embodiments provide a comprehensive approach to identifying hallucinations by examining various aspects of the response. This comprehensive approach improves the overall reliability and accuracy of hallucination detection.

Example Hardware and Software Components

Referring to FIG. 1, an example comprehensive hallucination evaluation system 100 includes a language model server 202, a hallucination detection server 302, and client devices 106-116 which may be communicatively connected through a network 130, as described below. In an embodiment, the language model server 202 and the hallucination detection server 302 may communicate via wireless signals 120 over a digital network 130 with the client devices 106-116, which can be any suitable local or wide area network(s) including a Wi-Fi network, a Bluetooth network, a cellular network such as 3G, 4G, Long-Term Evolution (LTE), 5G, the Internet, etc. In some instances, the client devices 106-116 may communicate with the digital network 130 via an intervening wireless or wired device 118, which may be a wireless router, a wireless repeater, a base transceiver station of a mobile telephony provider, etc. The language model server 202 and the hallucination detection server 302, may also communicate with each other over the digital network 130, or may directly communicate with each other wired/wirelessly.

The client devices 106-116 may include, by way of example, a tablet computer 106, a network-enabled cell phone 108, a personal digital assistant (PDA) 110, a mobile device smart-phone 112 also referred to herein as a "mobile device," a laptop computer 114, a desktop computer 116, a portable media player (not shown), a wearable computing device such as Google Glass™ (not shown), a smart watch, a phablet, any device configured for wired or wireless RF (Radio Frequency) communication, etc.

Each of the client devices 106-116 may interact with the language model server 202 to transmit a query to receive a response. The client devices 106-116 can enable users to access a language model of the language model server 202 from different environments and contexts. Upon receiving the query, the language model server 202 can process the input (e.g., the query) using the language model to generate the response. The language model server 102 can then transmit the response back to the client devices 106-116.

Each of the client devices 106-116 may also interact with the hallucination detection server 302 to evaluate the reliability of the response generated by the language model server 202. The hallucination detection server 302 may employ multiple hallucination evaluation techniques to evaluate whether the response is reliable or not. After performing the evaluation, the hallucination detection server 302 may provide feedback on the reliability of the response to the client devices 106-116.

In some embodiments, the language model server 202 and the hallucination detection server 302 may communicate directly with each other. Then, a client device 106-116 transmits a query to the language model server 202, the language model server 202 may generate a response to the query and directly transmit the response to the hallucination detection server 302. The hallucination detection server 302 may then evaluate the response, and transmit both the response and the feedback on the reliability of the response to the client device 106-116. In some embodiments, if the hallucination detection server 302 determines that the confidence score for the response is below a threshold confidence score and therefore the response is unreliable (i.e., hallucinatory), then the hallucination detection server 302 may transmit a message to the language model server 202 to generate a new response.

The language model server 202 and the hallucination detection server 302 may also be communicatively connected to a database 154. The database 154 may store information associated with users associated with the language model server 202 and the hallucination detection server 302 including historical queries, responses, and indications of the reliability of the responses. The database 154 may also store training data that the language model server 202 can use to train its language model. Additionally, the database 154 may store context information in which the language model server 202 can use to generate a response and in which the hallucination detection server 302 can use to evaluate the reliability of the response. The context information can include a predefined corpus (e.g., collection of texts or resources that can be used as a reference for different tasks) that is used to support the generation of the response, or verify the generated response. For example, if the language model determines that there are "9 total planets in the solar system" in a response, then the hallucination detection server 302 may use the context information which indicates the number of planets in the solar system from the predefined corpus to verify the reliability of the response using the context information.

The language model of the language model server 202 and hallucination evaluation techniques of the hallucination detection server 302 (e.g., a query classification technique, a chunk relatedness assessment technique, etc.) that use a machine learning model may be configured to implement machine learning, such that the model/engine "learns" to analyze, organize, and/or process data without being explicitly programmed. Machine learning may be implemented through machine learning methods and algorithms. In one exemplary embodiment, a machine learning module may be configured to implement machine learning methods and algorithms.

In some embodiments, at least one machine learning method and algorithm may be applied, which may include but is not limited to: linear or logistic regression, instance-based algorithms, regularization algorithms, decision trees, Bayesian networks, naïve Bayes algorithms, cluster analysis, association rule learning, neural networks (e.g., convolutional neural networks, deep learning neural networks, combined learning module or program), deep learning, combined learning, reinforced learning, dimensionality reduction, support vector machines, k-nearest neighbor algorithms, random forest algorithms, gradient boosting algorithms, Bayesian program learning, voice recognition and synthesis algorithms, image or object recognition, optical character recognition, natural language understanding, and/or other ML programs/algorithms either individually or in combination. In various embodiments, the implemented machine learning methods and algorithms are directed toward at least one of several categorizations of machine learning, such as supervised learning, unsupervised learning, and reinforcement learning.

In one embodiment, the language model and the hallucination evaluation techniques (e.g., a query classification technique, a chunk relatedness assessment technique, etc.) may employ supervised learning, which involves identifying patterns in existing data to make predictions about subsequently received data. Specifically, the language model and the hallucination evaluation techniques may be "trained" using training data, which includes example inputs and associated example outputs. Based upon the training data, the language model and the hallucination evaluation techniques may generate a predictive function which maps outputs to inputs and may utilize the predictive function to generate machine learning outputs based upon data inputs.

In another embodiment, the language model and the hallucination evaluation techniques may employ unsupervised learning, which involves finding meaningful relationships in unorganized data. Unlike supervised learning, unsupervised learning does not involve user-initiated training based upon example inputs with associated outputs. Rather, in unsupervised learning, the language model and the hallucination evaluation techniques may organize unlabeled data according to a relationship determined by at least one machine learning method/algorithm employed by the language model and the hallucination evaluation techniques. Unorganized data may include any combination of data inputs and/or machine learning outputs as described above.

In yet another embodiment, the language model and the hallucination evaluation techniques may employ reinforcement learning, which involves optimizing outputs based upon feedback from a reward signal. Specifically, the language model and the hallucination evaluation techniques may receive a user-defined reward signal definition, receive a data input, utilize a decision-making model to generate a machine learning output based upon the data input, receive a reward signal based upon the reward signal definition and the machine learning output, and alter the decision-making model so as to receive a stronger reward signal for subsequently generated machine learning outputs. Other types of machine learning may also be employed, including deep or combined learning techniques.

After training, machine learning programs (or information generated by such machine learning programs) may be used to evaluate additional data. Such data may be and/or may be related to intent data, user device data, and/or other data that was not included in the training dataset. The trained machine learning programs (or programs utilizing models, parameters, or other data produced through the training process) may accordingly be used for determining, assessing, analyzing, predicting, estimating, evaluating, or otherwise processing new data not included in the training dataset.

It is to be understood that supervised machine learning and/or unsupervised machine learning may also comprise retraining, relearning, or otherwise updating models with new, or different, information, which may include information received, ingested, generated, or otherwise used over time.

Moreover, although the methods described elsewhere herein may not directly mention machine learning techniques, such methods may be read to include such machine learning for any determination or processing of data that may be accomplished using such techniques. In some aspects, such machine learning techniques may be implemented automatically upon occurrence of certain events or upon certain conditions being met. In any event, use of machine learning techniques, as described herein, may begin with training a machine learning program, or such techniques may begin with a previously trained machine learning program.

Language Model Server

Figure 2:
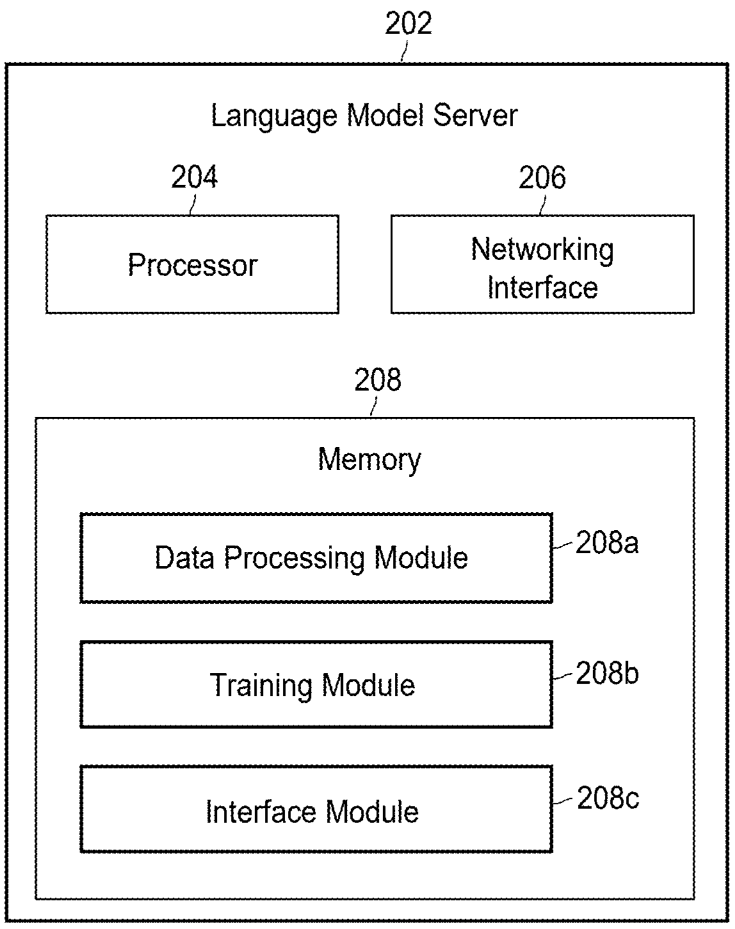
FIG. 2 illustrates a block diagram of an example language model server that can operate in the system of FIG. 1.

Turning now to FIG. 2, the language model server 202 may include one or more processors 204, a networking interface 206, and one or more memories 208. The memories 208 may comprise a data processing module 208A, a training module 208B, and an inference module 208C. The language model server 202 may be connected to a database 154, which stores training data which the language model server 202 can use to train its language model.

As shown in FIG. 2, the memories 208 may store various applications for execution by the processor 204. The language model server 202 may use a training module 208B to train a language model. The training module 208B may employ various machine learning techniques such as supervised learning, unsupervised learning, and reinforcement learning to train the language model as described in FIG. 1. The training module 208B may use the training data from the database 154 to train the language model.

The language model server 202 may use the data processing module 208A to process data before it is used by the training module 208B to train the model. The data processing module 208A can be responsible for tasks such as data cleaning, normalization, tokenization, and feature extraction. These preprocessing steps ensure that the data is in a suitable format for training the language model, enhancing the model's ability to learn effectively from the data. The language model server 202 may additionally use the data processing module 208A to transform queries received from client devices 106-116 to a format that is suitable for the language model to process and determine a response.

The inference module 208C may use the language model trained by the training module 208B to generate responses to queries received from users. The language model server 202 may receive queries from the client devices 106-116. The inference module 208C may first utilize the data processing module 208A to process the queries to match the format expected by the trained language model. The inference module 208C may then feed the preprocessed queries into the language model to obtain responses.

The language model server 202 may receive training data from the database 154 via networking interface 206 to train the language model. The language model server 202 may additionally receive inputs (e.g., queries) from the client devices 106-116 and transmit outputs (e.g., responses) to the client devices 106-116 via the networking interface 206.

The networking interface 206 may enable the language model server 202 to communicate with other devices, and/or any other suitable devices or combinations thereof. The networking interface 206 may support wired or wireless communications, such as USB, Bluetooth, Wi-Fi Direct, Near Field Communication (NFC), etc. The networking interface 206 may enable the language model server 202 to communicate via a wireless communication network such as a fifth-, fourth-, or third-generation cellular network (5G, 4G, or 3G, respectively), a Wi-Fi network (802.11 standards), a WiMAX network, or any other suitable wide area network (WAN), local area network (LAN), or personal area network (PAN), etc. Moreover, the network may be a single communication network, or may include multiple communication networks of one or more types (e.g., one or more wired and/or PANs or LANs, and/or one or more WANs such as the Internet).

More generally, the one or more processors 204 may include any suitable number of processors and/or processor types. For example, the processors 204 may include one or more CPUs and one or more graphics processing units (GPUs). Generally, each of the processors 204 may be configured to execute software instructions stored in the corresponding one or more memories 208. The memories 208 may include one or more persistent memories (e.g., a hard drive and/or solid-state memory) and may store one or more applications, modules, and/or models, such as the data processing module 208A, the training module 208B, and/or the inference module 208C.

Figure 3:
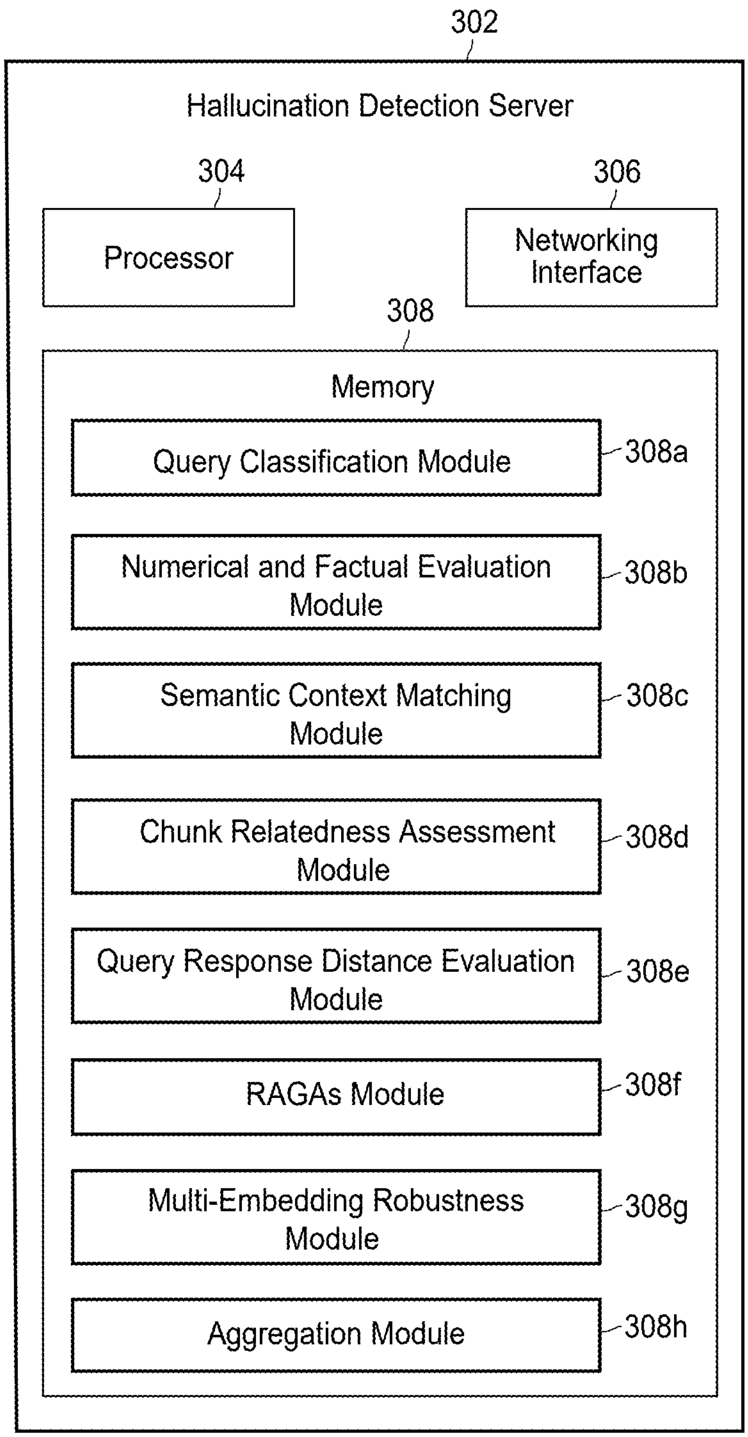
FIG. 3A illustrates a block diagram of an example hallucination detection server that can operate in the system of FIG. 1.
FIG. 3B illustrates an example comparison between two documents using word mover's distance to determine semantic similarities between the document.

Referring now to FIG. 3A, the hallucination detection server 302 can include one or more processors 304, a networking interface 306, and one or more memories 308. The memories 308 include hallucination evaluation modules for performing the hallucination evaluation techniques. More specifically, the memories 308 include a query classification module 308*a*, a numerical and factual evaluation module 308*b*, a semantic context matching module 308*c*, a chunk relatedness assessment module 308*d*, a query-response distance evaluation module 308*c*, a retrieval augmented generation assessment (RAGAs) module 308*f*, and a multi-embedding robustness module 308*g*. The memories 308 may also include an aggregation module 308*h* to aggregate hallucination scores generated by the hallucination evaluation modules to determine a confidence score. The hallucination detection server 302 may use the confidence score to evaluate the reliability of the response.

Each of the modules 308*a*-308*h* may perform a different hallucination evaluation technique to generate a different score. More specifically, the query classification module 308*a* may perform a query classification technique to generate a probabilistic score indicating the probability of the query leading to a hallucination in the response. The numerical and factual evaluation module 308*b* may perform a numerical and factual evaluation to generate a factual validation score. The semantic context matching module 308*c* may perform semantic context matching to generate a sematic context matching score. The chunk relatedness assessment module 308*d* may perform a chunk relatedness assessment to generate a chunk relatedness score. The query-response distance evaluation module 308*e* may perform a query-response distance evaluation to generate a query-response distance score. The RAGAs module 308*f* may perform a RAGAs technique to generate a RAGAs score. The multi-embedding robustness module 308*g* may perform a multi-embedding robustness technique to generate a multi-embedding score.

In some embodiments, the hallucination detection server 302 may obtain a query provided to a language model and a response to the query generated by the language model from a language model server 202 or from a user device (e.g., client devices 106-116). The hallucination detection server 302, upon obtaining the query and the response, may evaluate the reliability of the response. The hallucination detection server 302 may apply multiple hallucination evaluation techniques to the query and/or the response to generate multiple hallucination scores (e.g., using modules 308*a*-308*g*). The hallucination detection server 302 may then aggregate or combine the plurality of hallucination scores in any suitable manner (e.g., using aggregation module 308*h*) to generate a confidence score, which indicates the reliability of the response. The hallucination detection server 302 may then provide an indication of the confidence score for display on a user device (e.g., client devices 106-116).

Query Classification

As mentioned above, the query classification module 308*a* may perform a query classification technique to determine the likelihood that the query will result in a response with a hallucination. For example, queries directly asking for numerical or factual values may be more likely to result in a hallucination than queries for storytelling or fictional content.

The query classification module 308*a* may train a machine learning model, such as a query classification model using a first set of queries that resulted in hallucinations and a second set of queries that did not result in hallucinations. The training data (i.e., the first set of queries that resulted in hallucinations and the second set of queries that did not result in hallucinations) can be obtained from the database 154.

For example, the query classification module 308*a* can train the query classification model by using supervised learning. Each query in the dataset can be labeled with an indication of whether or not the query resulted in a hallucination. For example, the first set of queries may be labeled with an indication that they lead to hallucinations and the second set of queries may be labeled with an indication that they did not lead to hallucinations.

Additionally, the query classification module 308*a* may analyze each of the queries in the first and second set to identify features of each query. These features may include terms in the query and their respective word embeddings, the arrangement of the terms in the query, the length of the query, whether the information being requested in the query is numerical or factual, etc.

The query classification module 308*a* can then train the query classification model using this dataset, so that the query classification model learns the patterns and characteristics of high-risk queries, and can distinguish between queries that are likely to result in hallucinations and queries that are not. The query classification model may be trained using any suitable machine learning technique, such as linear or logistic regression, instance-based algorithms, regularization algorithms, decision trees, Bayesian networks, naïve Bayes algorithms, cluster analysis, association rule learning, neural networks (e.g., convolutional neural networks, deep learning neural networks, combined learning module or program), deep learning, combined learning, reinforced learning, dimensionality reduction, support vector machines, k-nearest neighbor algorithms, random forest algorithms, gradient boosting algorithms, Bayesian program learning, etc. The training of the query classification model may not be limited to just supervised learning, but other machine learning techniques such as unsupervised, reinforcement learning, etc. may also be used.

The query classification module 308*a* may then obtain a query where it is unknown whether the response includes a hallucination to the query classification model to determine a probabilistic score based on a probability of the response including a hallucination. The query classification module 308*a* may analyze the query to identify features of the query. Then the query classification module 308*a* may apply the features of the query to the query classification model to determine the probabilistic score for the query.

For example, if the query classification model includes a decision tree, the leaves of the decision tree may represent different probabilities of whether the query will result in a response with a hallucination. The nodes of the decision tree may represent different tests with respect to the features of the query (e.g., does the query include more than 10 terms?). The query classification module 308*a* may follow the branches of the decision tree according to the tests at respective nodes to reach a leaf node in the decision tree which indicates a probability of whether the query will result in a response with a hallucination.

An equation for determining the probabilistic score can be represented as $$\text{Class} = \hat{y}_i = \sum_{k=1}^{K} f_k(x)_i,\ f_k \in \mathcal{F}$$

where $\hat{y}_i$ can represent the probabilistic score, K can represent the number of features, $fx(x)_i$ can represent a function applied to the kth feature, and x can be the query. The outputs of the functions applied to the individual features can then be summed to determine the probabilistic score $\hat{y}_i$. For example, the query classification model may include this function when the machine learning technique is a regression algorithm. A high probabilistic score may indicate that the response to the query is not likely to include a hallucination and is therefore reliable, whereas a low probabilistic score may indicate that the response to the query is likely to include a hallucination and is therefore unreliable.

As an illustrative example, a query may be "What is the diameter of the Earth?" The query classification module 308*a* may use the query classification model to determine a probability of the response to the query including a hallucination. The query classification module 308 may identify different features of the query, such as the number of words in the query, specific information being requested, the arrangement of the terms, etc. The query classification module 308*a* may apply the features of the query to the query classification model to determine the probabilistic score for the query. For instance, the feature score for the number of terms in the query may be high as the query is short. The feature score for the specific information being requested may be low, as the query is a numerical question. The feature scores for the different features may then be analyzed or summed overall to determine the probabilistic score.

In other embodiments, the query classification module 308*a* may not use a machine learning model to determine the probabilistic score. Instead, the query classification module 308*a* evaluates features of the query using a set of rules to determine the probabilistic score. For example, the query classification module 308*a* may assign a probability of 0 to queries that request numerical or factual information and may assign a probability of 1 to queries that do not request numerical or factual information.

Numerical and Factual Evaluation

The numerical and factual evaluation module 308*b* may perform a numerical and factual evaluation. More specifically, the numerical and factual evaluation module 308*b* may determine whether the numbers and specific facts in the response match with other reliable sources (e.g., sources in the database 154).

The numerical and factual evaluation module 308*b* can identify numerical or factual information within the response. The numerical and factual evaluation module 308 may identify each instance of numerical or factual information in the response as a key-value pair, where the type of numerical or factual information is the key and value for the type of the numerical or factual information is the value. For example, for the response, "The population of New York City is approximately 8 million people," the type of the numerical or factual information is "New York City population," and the value is "8 million people." The numerical and factual evaluation module 308*b* may employ a named entity recognition (NER) algorithm or a regular expression (REGEX) algorithm to identify the type of the numerical or factual information and the value for the numerical or factual information.

Then the numerical and factual evaluation module 308*b* may obtain a known value for each identified type of numerical or factual information from a database (e.g., database 154). For example, the numerical and factual evaluation module 308*b* may obtain the New York City population from the database 154 which is 8 million people. As stated previously, the database may include a predefined corpus that the numerical and factual evaluation module 308*b* can use to obtain the known value. The numerical and factual evaluation module 308*b* may then compare each value from the response to corresponding known values from the database 154 to determine a factual validation score.

An equation to determine the factual validation score (FVS) can be represented as:

$$FVS = \frac{(\text{Number of matched key} - \text{value pairs})}{\text{Total number of key} - \text{value pairs}}$$

where the Number of matched key-value pairs represents the number of key-value pairs having values which match with the known values in the database 154. The Total number of key-value pairs may represent the total number of key-value pairs identified from the response.

A high factual validation score may indicate that most of the numerical and factual information in the response is verified to be correct, and therefore the response is reliable. A low factual validation score may indicate that most of the numerical and factual information in the response is not verified to be correct, and therefore the response is likely to be unreliable.

As an illustrative example, the response may be "The population of New York City is approximately 8 million people. The population of Chicago is 20000". The numerical and factual evaluation module 308*b* may identify numerical or factual information within the response. The numerical and factual evaluation module 308*b* may identify two types of the numerical or factual information: "New York City population" and "Chicago population." The numerical and factual evaluation module 308*b* may determine that the value for "New York City population" from the response is "8 million" while the value for "Chicago population" is "20000." The numerical and factual evaluation module 308*b* may then identify the New York City population and Chicago population from the database 154, and may determine that the New York City population is "8 million" and the Chicago population is 2.75 million. Since only the value for the New York City population matches with the known value from the database 154, the number of matched key-value pairs may be 1, while the total number of key-value pairs may be 2. Therefore, the factual validation score may be ½ or 0.5.

Semantic Context Matching

The semantic context matching module 308*c* may perform semantic context matching. To perform semantic context matching, the semantic context matching module 308*c* may determine if the response matches with the topic(s) of the query.

The semantic context matching module 308*c* may divide the response into multiple chunks. The semantic context matching module 308*c* may employ different methods to divide the response into chunks including sentence-based chunks that divide the response based on sentences, contextual chunks that divide the response based on context or content, semantic chunks that use semantic analysis to create chunks that capture coherent ideas, etc.

Upon dividing the response into different chunks, the semantic context matching module 308*c* may identify a semantic context of each chunk. The semantic context may refer to the meaning and relationships between words or phrases within a given text. The semantic context can encompass nuances and connotations that words carry based on their usage in different situations. Semantic context can capture intended meaning, identify relevant associations, and infer implied information. For example, in a sentence "she sat by the river bank, watching the water flow," the semantic context indicates that the word "bank" is used in the context of a river, implying a landform beside a river rather than a financial institution.

To identify the semantic context for each chunk, the semantic context matching module 308*c* may convert each chunk into a word embeddings vector using a word embedding model. The word embedding model can convert words or sentences into numerical vectors. These vectors can capture semantic relationships and contextual meaning of word or sentences by representing them as points in a vector space. For example, words or sentences with similar meanings or usage patterns may be positioned close together in the vector space. The word embedding model can be a machine learning model trained to transform words or sentences into numerical vectors that capture their semantic meanings and relationships.

The semantic context matching module 308*c* may then analyze the query to identify a semantic context for the query by converting the query into a word embeddings vector using the word embedding model. The semantic context matching module 308*c* may then compare the semantic context for each chunk to the semantic context for the query by comparing similarities (e.g., cosine similarities) between the word embeddings vector of each chunk of the plurality of chunks to the word embeddings vector of the query. The semantic context matching module 308*c* may determine cosine similarities between the word embeddings vector for each chunk and the word embeddings vector for the query. The cosine similarities may indicate the degree of semantic similarity between the query and each chunk.

The semantic context matching module 308*c* may then determine a semantic context matching score based on the differences between the semantic contexts for each of the plurality of chunks and the semantic context for the query. The semantic context matching module 308*c* may determine the differences by computing a summation of similarities (e.g., cosine similarities) between the word embeddings vector for each chunk and the word embeddings vector for the query, and dividing the summation by the total number of chunks to determine the semantic context matching score.

An equation to determine the semantic context matching score (SCMS) can be represented as $$SCMS = \frac{\sum \text{Cosine similarities}}{\text{Number of retrieved chunks}}$$

where the ΣCosine similarities may indicate a summation of cosine similarity between the word embeddings vector of the query and the word embeddings vector of each chunk. The Number of retrieved chunks can represent the total number of chunks.

Alternatively, the semantic context matching module 308*c* may use other methods to determine similarities, such as a Euclidean distance similarity (a measure of distance between the vectors representing the two text segments) and Jaccard similarity (which measures the overlap between the sets of words in the two text segments).

The cosine similarity between two vectors can be obtained by using the following formula:

$$\text{Cos}(A, B) = \frac{A \cdot B}{\|A\| \, \|B\|}$$

where the numerator A·B is a dot product between vector A and vector B, and the denominator ||A||||B|| is multiplication of magnitudes of vector A and vector B A high semantic context matching score may indicate that the chunks in the response are semantically similar to the query, and therefore the response is likely to be reliable. A low semantic context matching score may indicate that the chunks in the response are not semantically similar to the query, and therefore the response is likely to be unreliable.

As an illustrative example, the query can be "what is the capital of France?" with a response "Paris is a major European city. It is known for its beautiful landmarks like the Eiffel Tower. Paris is also the capital city of France." The semantic context matching module 308*c* may divide the response into different chunks (e.g., sentence-based chunks), with a first chunk being "Paris is a major European city," a second chunk being "It is known for its beautiful landmarks like the Eiffel Tower," and a third chunk being "Paris is also the capital city of France." The semantic context matching module 308*c* may convert each chunk and the query into word embeddings vectors using the word embedding model.

The semantic context matching module 308*c* may then determine cosine similarities between the word embeddings vector of each chunk and the word embeddings vector of the query. As an example, the word embeddings vector for the query (Q) can be [0.25, 0.10, 0.75], the word embeddings vector for the first chunk (C1) can be [0.20, 0.15, 0.65], the word embeddings vector for the second chunk (C2) can be [0.30, 0.25, 0.55], and the word embeddings vector for the third chunk (C3) can be [0.25, 0.1, 0.75]. The dot product between the word embeddings vector for each chunk and the word embeddings vector for the query can be $$Q \cdot C1 = (0.25 \times 0.20) + (0.10 \times 0.15) + (0.75 \times 0.65) = 0.5525$$

$$Q \cdot C2 = (0.25 \times 0.30) + (0.10 \times 0.25) + (0.75 \times 0.55) = 0.5125$$

$$Q \cdot C3 = (0.25 \times 0.25) + (0.10 \times 0.10) + (0.75 \times 0.75) = 0.635$$

and the magnitude of each word embeddings vector for each chunk (c1, c2, c3) and word embeddings vector for the query (Q) can be $$\|Q\| = \sqrt{(0.25\text{^}2) + (0.10\text{^}2) + (0.75\text{^}2)} \approx 0.797$$

$$\|C1\| = \sqrt{(0.20\text{^}2) + (0.15\text{^}2) + (0.65\text{^}2)} \approx 0.697$$

$$\|C2\| = \sqrt{(0.30\text{^}2) + (0.25\text{^}2) + (0.55\text{^}2)} \approx 0.674$$

$$\|C3\| = \sqrt{(0.25\text{^}2) + (0.10\text{^}2) + (0.75\text{^}2)} \approx 0.797$$

Therefore, the cosine similarities are:

$$\frac{Q \cdot C1}{\|Q\|\|C1\|} = 0.994$$

$$\frac{Q \cdot C2}{\|Q\|\|C2\|} = 0.954$$

$$\frac{Q \cdot C3}{\|Q\|\|C3\|} = 1.0$$

$$SCMS = \frac{\sum \text{Cosine similarities}}{\text{Number of retrieved chunks}} = \frac{(.994 + .954 + 1.0)}{3} \approx .983$$

showing that the response is very much related to the query in this example.

Chunk Relatedness Assessment

The chunk relatedness assessment module 308*d* may perform a chunk relatedness assessment. To perform the chunk relatedness assessment, the chunk relatedness assessment module 308*d* may determine how related each chunk of the response is to each other to determine whether they correspond to the same coherent topic.

The chunk relatedness assessment module 308*d* may divide the response into chunks. Similar to the semantic context matching module to divide the response into chunks, the chunk relatedness assessment module 308*d* may employ different methods including sentence-based chunks that divide the response based on sentences, contextual chunks that divide texts based on context or content, semantic chunks that use semantic analysis to create chunks that capture coherent ideas, etc.

The chunk relatedness assessment module 308*d* may then apply a topic modeling algorithm (e.g., Latent Dirichlet Allocation) to each chunk in the plurality of chunks in order to identify a topic for the chunk. The topic modeling algorithm can help look for patterns in the words used across the chunks, and assign a topic or topics to each chunk. For example, the chunk relatedness assessment module 308*d* may associate a chunk with words like "spaceship," "planet," and "alien" with a "Science Fiction" topic and associate a chunk with words like "recipe," "ingredients," and "bake" with a "Cooking" topic.

In some embodiments, the chunk relatedness assessment module 308*d* identifies probabilities that a chunk corresponds to different topics. For example, the chunk relatedness assessment module 308*d* may determine that a first chunk has a 98% probability of being about a dog and a 2% probability of being about a cat. The chunk relatedness assessment module 308*d* may also determine that a second chunk has a 5% probability of being about a dog and a 95% probability of being about a cat. Additionally, the chunk relatedness assessment module 308*d* may determine that a third chunk has a 90% probability of being about a dog and a 10% probability of being about a cat.

Then for each pair of chunks, the chunk relatedness assessment module 308*d* may assign a topic coherence score to the pair based on the relatedness of the topics for each chunk in the pair. The topic coherence score may indicate how well the pair of chunks relate to each other. A pair of chunks with similar topics may result in higher topic coherence score than a pair of chunks with different topics. Example algorithms that the chunk relatedness assessment module 308*d* can use to determine the topic coherence scores can be pointwise mutual information (PMI), topic coherence metrics such as UMass coherence or UCI coherence, etc. In other embodiments, such as when the chunk relatedness assessment module 308*d* identifies probabilities that a chunk corresponds to different topics, the chunk relatedness assessment module 308*d* multiplies the probabilities that a pair of chunks correspond to a particular topic and aggregates the multiplied probabilities to determine the topic coherence score for the pair.

The chunk relatedness assessment module 308*d* may then determine a chunk relatedness score based on the topic coherence score for each pair of chunks. The chunk relatedness assessment module 308*d* may sum all of the topic coherence scores for each pair of chunks, and divide by the total number of pairs of chunks. The chunk relatedness score (CRS) can be obtained using the following formula:

$$CRS = \frac{\sum \text{Topic coherence scores}}{\text{Number of topic pairs}}$$

where the numerator ΣTopic coherence scores is a summation of all the topic coherence scores for each pair of chunks, and the denominator Number of topic pairs is the total number of topic pairs.

A high chunk relatedness score may indicate that the topics in the chunks in the response are similar and coherent, and therefore the response is likely to be reliable. A low chunk relatedness score may indicate that topics in the chunks in the response are dissimilar and incoherent, and therefore the response is likely to be unreliable. In some instances, such as when the query includes questions about multiple topics, some chunks may be unrelated. By only using the chunk relatedness assessment, the hallucination detection server 302 may inaccurately determine that the response is unreliable. However, by combining multiple hallucination evaluation techniques to detect a hallucination, the hallucination detection server 302 can perform a more accurate analysis.

As an illustrative example, a response may be "Eating a high-protein diet helps build muscle mass and improve overall metabolism. Different types of protein supplements can aid in bodybuilding and muscle recovery. Baking a cake requires ingredients like flour, sugar, and eggs." The chunk relatedness assessment module 308*d* may divide the response into chunks. The chunk relatedness assessment module 308*d* may divide the response based on sentences, and determine that a first chunk may be "Eating a high-protein diet helps build muscle mass and improve overall metabolism," a second chunk may be "Different types of protein supplements can aid in bodybuilding and muscle recovery," and a third chunk may be "Baking a cake requires ingredients like flour, sugar, and eggs."

The chunk relatedness assessment module 308*d* may apply the topic modeling algorithm to the three chunks to determine that the first chunk has topic probabilities of Topic 1 (Nutrition & Muscle Growth): 0.8 and Topic 2 (Backing & Recipes): 0.2, the second chunk has topic probabilities of Topic 1 (Nutrition & Muscle Growth): 0.9 and Topic 2 (Baking & Recipes): 0.1, and the third chunk has topic probabilities of Topic 1 (Nutrition & Muscle Growth): 0.1 and Topic 2 (Backing & Recipes): 0.9.

The chunk relatedness assessment module 308*d* may then determine a topic coherence score for each pair based on the topics. The topic coherence score for each pair is calculated as follows:

Coherence Score Between Chunk 1 and Chunk 2:
- Similarity in Topic 1:0.8×0.9=0.72
- Similarity in Topic 2:0.2×0.1=0.02
- Topic Coherence Score: 0.72+0.02=0.74

Coherence Score Between Chunk 1 and Chunk 3:
- Similarity in Topic 1:0.8×0.1=0.08
- Similarity in Topic 2:0.2×0.9=0.18
- Topic Coherence Score: 0.08+0.18=0.26

Coherence Score Between Chunk 2 and Chunk 3:
- Similarity in Topic 1:0.9×0.1=0.09
- Similarity in Topic 2:0.1×0.9=0.09
- Topic Coherence Score: 0.09+0.09=0.18

Upon determining the three topic coherence scores, the topic coherence scores can be summed and be divided by the total number of pairs to determine a chunk relatedness score:

$$CRS = \frac{(0.74 + 0.26 + 0.18)}{3} = \frac{1.18}{3} \approx 0.39$$

Therefore, the chunk relatedness score for this example can be 0.39.

Query-Response Distance Evaluation

The query-response distance evaluation module 308*e* may perform a query-response distance evaluation. To perform the query-response distance evaluation, the query-response distance evaluation module 308*e* may determine semantic similarities between the query and the response by determining how "far" the query is from the response in semantic context.

The query-response distance evaluation module 308*e* may convert the query and the response into a query vector and a response vector by using a word embedding model. The word embedding model captures the semantic context of an input in vector form. The query-response distance evaluation module 308*e* can then determine a minimum distance to transform the query vector into the response vector. The query-response distance evaluation module 308*e* may determine the minimum distance by using a word mover's distance (WMD). The WMD can measure the Euclidean distance between the query vector and the response vector, and calculate the minimum cost to transform the query vector into the response vector.

In some embodiments, the query-response distance evaluation module 308*e* may convert each word in the query and the response into a vector using the word embedding model, and output a plurality of query word vectors and a plurality of response word vectors. In some cases, certain common verbs such as "is" or "are" and articles such as "a" may not be converted into a vector. The query-response distance evaluation module 308*e* may then determine Euclidean distances of all combinations of query word vectors and response word vectors. The query-response distance evaluation module 308*e* may then determine a minimum cost (distance) required to transform each query word vector into each response word vector using the Euclidean distances of all combinations.

Figure 3B:
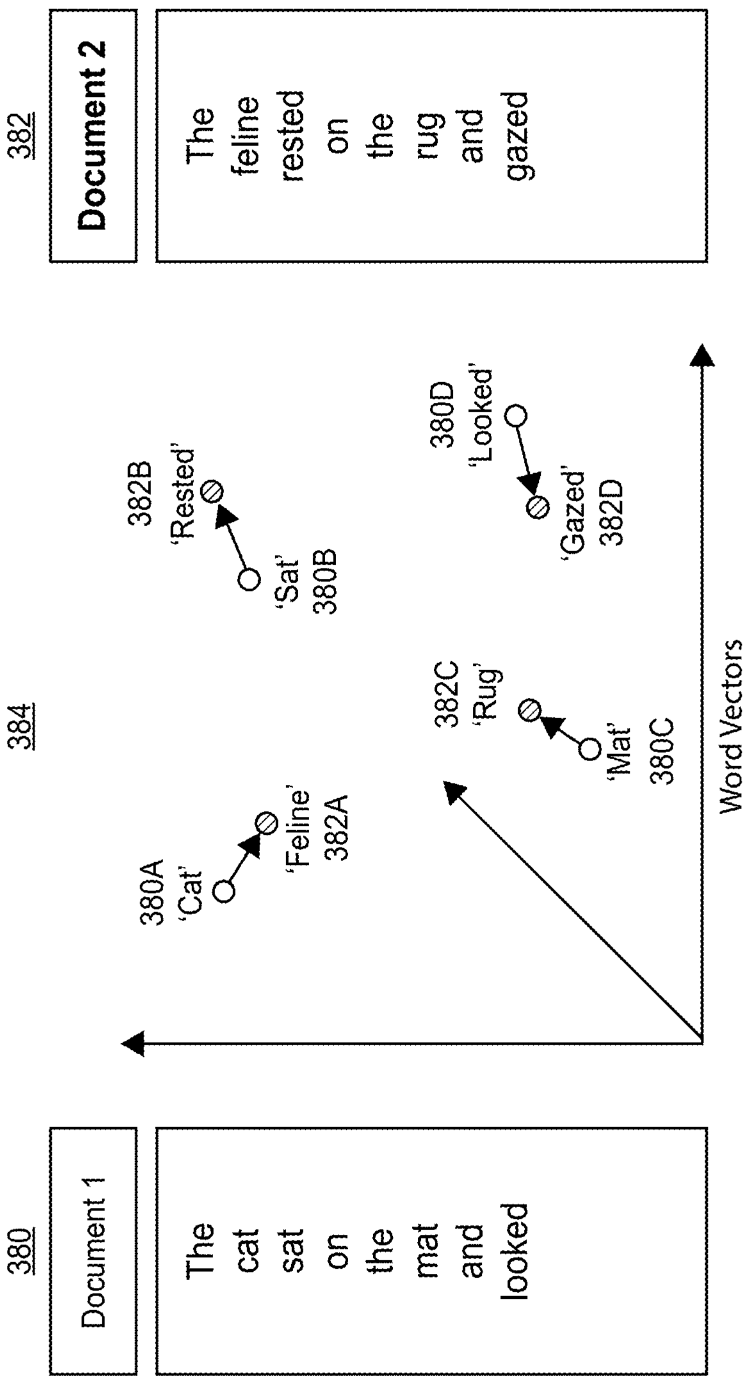

FIG. 3B illustrates how semantic similarity between Document1 380 and Document2 382 is determined using word mover's distance. The query-response distance evaluation module 308*e* may convert words in Document1 380 and words in Document2 382 into vectors using the word embedding model, resulting in word vectors in Document1 380A-380D and word vectors in Document2 382A-382D in semantic space 384. The query-response distance evaluation module 308*e* may then determine a minimum distance to transform each word vector in document1 380A-380D into each word vector in document2 382A-382D as indicated by the arrows.

The greater the WMD is, the greater the transformation of the query vector to the response vector is, signifying that the query is semantically different than the response. The smaller the WMD is, the smaller the transformation of the query vector to the response vector is, signifying that the query is semantically similar to the response.

The query-response distance evaluation module 308*e* may then determine a query-response distance score based on the minimum distance between word vectors. The formula to determine the query-response distance score (QRDS) can be:

$$QRDS = 1 - \frac{WMD\,(\text{query, response})}{\text{Max distance}}$$

where the numerator WMD(query, response) is the WMD between the query vector and the response vector, the denominator Max distance is the max distance between the any two vectors. The QRDS may have an inverse relationship with the WMD.

A high query-response distance score may indicate that the query is semantically similar to the response, and therefore the response is likely to be reliable. A low query-response distance score may indicate that the query is semantically dissimilar from the response, and therefore the response is likely to be unreliable.

As an illustrative example, the query can be "what is the capital city of France?" with a response "Paris is the capital of France." The query-response distance evaluation module 308*e* may convert each word in the query and the response into a vector using the word embedding model, and output query word vectors and response word vectors.

Query word vectors: "capital": (0.5, 0.6), "city": (0.8, 0.9), "France": (0.6, 0.7)·

Response word vectors: "Paris": (0.7, 0.8), "capital": (0.5, 0.6), "France": (0.6, 0.7)

The query-response distance evaluation module 308*e* may then compute Euclidean distances between each pair of words from the query and the response. The smallest Euclidean distance between the pair of words are:

$$\text{Distance}(\text{"city"}, \text{"Paris"}) = \sqrt{\left((0.8-0.7)^2 + (0.9-0.8)^2\right)} \approx 0.141$$

$$\text{Distance}(\text{"capital"}, \text{"capital"}) = 0$$

$$\text{Distance}(\text{"France"}, \text{"France"}) = 0$$

Therefore, the WMD is $$WMD = 0.141 + 0 + 0 = 0.141$$

The query-response distance evaluation module 308*e* may normalize the distance to √2, such that the max distance between any two vectors may not be greater than √2. Therefore, the query-response distance score is $$QRDS = 1 - \frac{0.141}{\sqrt{2}} = 0.900$$

Retrieval Augmented Generation Assessment (RAGAs)

The RAGAs module 308*f* may perform a RAGAs. To perform the RAGAs, the RAGAs module 308*f* may determine the faithfulness of the response (whether the response is grounded in the context), the relevance of the response (how well the response addresses the query), and the context relevance (whether the retrieved context contains only the information necessary to answer the query).

The RAGAs module 308*f* can obtain a context for the query. The context can be from a predefined corpus (e.g., collection of texts or resources that can be used as a reference for different tasks) that is used to support the generation of the response, or to verify the generated response. The context may be stored in database 154 of FIG. 1, and the hallucination detection server 302 may use the networking interface 306 to communicate with the database 154 to retrieve the context. The RAGAs module 308*f* may employ different methods to obtain context to the query. For example, the RAGAs module 308*f* may have a separate large language model, trained solely on the predefined corpus, that the RAGAs module 308*f* may use to obtain the context information relevant to the query. In another example, the RAGAs module 308*f* may use semantic search or keyword matching to obtain context information relevant to the query.

In any event, the RAGAs module 308*f* may divide the response into a number of statements. The RAGAs module 308*f* may employ different methods to divide the response into a number of statements including sentence-based statements that divide the response based on sentences, contextual statements that divide the response based on context or content, semantic statements that use semantic analysis to create statements that capture coherent ideas, etc.

The RAGAs module 308*f* may then determine a faithfulness score based on the number of statements in the response that are supported by the context. The formula to determine the faithfulness, F, may be:

$$F = \frac{|V|}{|S|}$$

where |V| can represent a number of statements supported by the context, and |S| can represent the total number of statements extracted from the response.

As an illustrative example, the query may be "What is the height of the Eiffel Tower", and the response generated to the query can be "The Eiffel Tower is a landmark in Paris. It was built in 1889 and is 324 meters tall. It is the tallest building in France." The RAGAs module may determine the context to the query by using a large language model, and obtain the context "The Eiffel Tower is located in Paris, France. It was completed in 1889 and stands 324 meters tall." The RAGAs module may determine that there are four statements in the response: 1) "The Eiffel Tower is a landmark in Paris," 2) "It was built in 1889," 3) "It is 324 meters tall," and 4) It is the tallest building in France." The RAGAs module may determine that statements 1, 2, and 3 are supported by the context, while statement 4 is not supported. Therefore, the RAGAs module may determine that the response has a faithfulness score of $$F = \frac{|V|}{|S|} = \frac{3}{4} = 0.75.$$

A high faithfulness score may indicate that the response is well supported by the context, and therefore the response is likely to be reliable. A low faithfulness score may indicate that the response is not well supported by the context, and therefore the response is likely to be unreliable.

In addition to determining the faithfulness value, the RAGAs module 308*f* analyzes the response to identify potential question(s) which the response answers. The RAGAs module 308*f* can generate the potential question(s) using a separate machine learning model (e.g., large language model), a separate paraphrasing algorithm, etc. The RAGAs module 308*f* may then determine an answer relevance score based on differences between the potential question(s) and the query. The RAGAs module 308*f* may determine the differences between the question(s) using cosine similarity, Euclidean distance embeddings, Jaccard similarity, etc. The formula to determine the answer relevance (AR) score may be:

$$AR = \frac{1}{n}\sum_{i=1}^{n} sim(q, q_i)$$

where n represents the total number of potential questions, q represents the query, $q_i$ represents the $i^{th}$ potential question of the potential questions, and $sim(q,q_i)$ represents the similarity between the query and the potential question according to the cosine similarity, Euclidean distance embeddings, Jaccard similarity, etc.

As an illustrative example, the query can be "What is the height of the Eiffel Tower?" and the response can be "The Eiffel Tower is 324 meters tall and was completed in 1889." The RAGAs module 308*f* may use a separate machine learning model to analyze the response and identify potential question(s) that the response answers. The potential question(s) can be 1) "How tall is the Eiffel Tower?" and 2) "When was the Eiffel Tower completed?" The RAGAs module 308*f* may the determine a similarity between the query and each of the potential questions:

$$sim(q, q_1) = 0.9$$

$$sim(q, q_2) = 0.3$$

where q is the query and $q_i$ is the $i^{th}$ potential question. Since there are two potential questions, the relevance score can be determined to be:

$$AR = \frac{1}{2}(0.9 + 0.3) = 0.6$$

A high answer relevance score may indicate that the response addresses the query very well, and therefore the response is likely to be reliable. A low answer relevance score may indicate that the response does not address the query well, and therefore the response is likely to be unreliable.

Still further, the RAGAs module 308*f* can extract a number of relevant sentences from the context which are relevant to the query. The context may be the same context used to determine the faithfulness score. The RAGAs module 308*f* may then determine a context relevance score based on the number of relevant sentences compared to a total number of sentences in the context. The context relevance score can assess whether the retrieved context contains only the information necessary to answer the question, aiming to penalize the inclusion of irrelevant information. The formula to determine the context relevancy (CR) score is:

$$CR = \frac{\text{number of extracted sentences}}{\text{total number of sentences in } c(q)}$$

where the number of extracted sentences represents the number of relevant sentences from the context relevant to the query, and the total number of sentences in c(q) represents the total number of sentences in the context.

As an illustrative example, the query may be "What is the height of the Eiffel Tower?" The RAGAs module 308*f* may obtain the context from the predefined corpus. The context generated can be "The Eiffel Tower is located in Paris, France. It stands 324 meters tall." The RAGAs module 308*f* may determine that the total number of sentences is two, and determine that only the second sentence "It stands 324 meters tall" is relevant to the query. Therefore, the context relevancy score is $$CR = \frac{1}{2} = 0.5$$

A high context relevance score may indicate that most of the context is relevant to the query, while a low context relevance score may indicate that the context includes a significant amount of information which is not relevant to the query.

In some embodiments, the RAGAs module 308*f* may determine the faithfulness score, the relevance score, and the context relevance score in parallel. For example, the RAGAs module 308*f* may determine the faithfulness score while determining the relevance score and/or the context relevance score.

In any event, the RAGAs module 308*f* may determine a RAGAs score based on the faithfulness score, the relevance score, and the context relevance score. The RAGAs module 308*f* may combine the faithfulness score, the relevance score, and the context relevance score in any suitable manner to generate the RAGAs score. For example, the RAGAs module 308 may determine a weighted average for the faithfulness, answer relevance, and context relevance scores to generate the RAGAs score. As an illustrative example, if the RAGAs module 308*f* uses an equal weight for each of the faithfulness score, the answer relevance score, and the context relevance score, then the RAGAs score can be determined to be $$RAGAS_{score} = \frac{F + AR + CR}{3}$$

-continued $$RAGAS_{score}=\frac{0.75+0.6+0.5}{3}\approx 0.62$$

In some embodiments, the RAGAs module 308$f$ may apply different weights to the faithfulness, answer relevance, and context relevance scores in determining the RAGAs score. For example, the RAGAs module 308$f$ may weight the faithfulness score more heavily than the other scores.

A high RAGAs score may indicate that the response is faithful, the response is relevant to the query, and/or the context used to generate the response is relevant to answer the query. Therefore, the response is likely to be reliable. A low RAGAs score may indicate that the response is not faithful, the response is not relevant to the query, and/or the context used to generate the response is not relevant to answer the query. Therefore, the response is likely to be unreliable.

Multi-Embedding Robustness Method

The Multi-Embedding Robustness module 308$g$ may perform a multi-embedding robustness technique. To perform the multi-embedding robustness technique, the multi-embedding robustness module 308$g$ may employ different word embedding models to determine semantic similarities between the response and the context. By employing different word embedding models, the multi-embedding robustness module 308$g$ may capture semantic similarities of the response and the context more accurately.

The multi-embedding robustness module 308$g$ may obtain a context for a query in a similar manner as the RAGAs module 308$f$, for example by obtaining the context from a predefined corpus. The multi-embedding robustness module 308$g$ may employ different methods to obtain the context for the query. For example, the multi-embedding robustness module 308$g$ may have a separate large language model, trained solely on the predefined corpus, that the multi-embedding robustness module 308$g$ may use to obtain the context information relevant to the query. In another example, the multi-embedding robustness module 308$g$ may use semantic search or keyword matching to obtain context information relevant to the query.

The multi-embedding robustness module 308$g$ may then use a first word embedding model to convert the context and the response into a context vector and a response vector, respectively. The first word embedding model captures the semantic context of an input in vector form. The multi-embedding robustness module 308$g$ may then determine a difference between the context vector and the response vector. The difference can be obtained based on the cosine similarity, Euclidean distance, Jaccard similarity, etc. of the context vector and the response vector.

The multi-embedding robustness module 308$g$ may then repeat this process using multiple different word embedding models to convert the context and the response into context and response vectors, respectively. Then the multi-embedding robustness module 308$g$ may average the distances between the context vectors and the response vectors using multiple word embedding models. For example, the multi-embedding robustness module 308$g$ may determine a context vector and a response vector for a context and a response using a Word2Vec word embedding model. The multi-embedding robustness module 308$g$ may also determine a context vector and a response vector for the same context and response using a GloVe word embedding model. Additionally, the multi-embedding robustness module 308$g$ may determine a context vector and a response vector for the same context and response using a FastText word embedding model. Then the multi-embedding robustness module 308$g$ may average the distances between the context vectors and the response vectors generated using the different word embedding models to generate a multi-embedding score.

These three word embedding models are just a few example word embedding models for case of illustration only. The multi-embedding robustness module 308$g$ may use any suitable word embedding models or other machine learning models for converting words to vector format.

In any event, upon determining the difference between the context vector and the response vector for each word embedding model, the multi-embedding robustness module may combine the differences in any suitable manner to generate a multi-embedding score. For example, the multi-embedding score may be the average distance between the response and its respective context using each of the word embedding models. A formula to determine the multi-embedding score (MBdistance) can be:

$$\overline{MBdistance}=\frac{\sum_{i}^{n}\text{cosine similarity(response, context)}}{n}$$

where the response indicates the response vector, the context indicates the context vector, and n represents the number of word embedding models.

A high multi-embedding score may indicate that the response and the context are semantically similar, and therefore the response is likely to be reliable. A low multi-embedding score may indicate that the response and the context are not semantically similar, and therefore the response is likely to be unreliable.

As an illustrative example, the response can be "The Eiffel Tower is 324 meters tall." And the context can be "The Eiffel Tower is one of the most iconic structures in the world, located in Paris, France. It stands at a height of 324 meters." The word embedding models can be BERT, GloVe, and FastText. For each word embedding model, the module 308$g$ can convert the response and the context into a different context vector and response vector.

Using BERT:

Response embedding (BERT): $r_{BERT}$

Context embedding (BERT): $c_{BERT}$

Using GloVe:

Response embedding (GloVe): $r_{GloVe}$

Context embedding (GloVe): $c_{GloVe}$

Using FastText:

Response embedding (FastText): $r_{FastText}$

Context embedding (FastText): $c_{FastText}$

The multi-embedding robustness module 308$g$ can then determine a difference between the context vector and the response vector for each word embedding model. The multi-embedding robustness module 308$g$ may determine the cosine similarity between the response vector and the context vector generated using each word embedding model.

$$\text{cosine similarity}_{BERT}=\frac{r_{BERT}\cdot c_{BERT}}{\|r_{BERT}\|\|c_{BERT}\|}=0.92$$

$$\text{cosine similarity}_{GloVe}=\frac{r_{GloVe}\cdot c_{GloVe}}{\|r_{GloVe}\|\|c_{GloVe}\|}=0.88$$

$$\text{cosine similarity}_{FastText}=\frac{r_{FastText}\cdot c_{FastText}}{\|r_{FastText}\|\|c_{FastText}\|}=0.9$$

Upon determining the cosine similarity score for each word embedding model of the plurality of word embedding models, the multi-embedding robustness module 308*g* can combine the differences (cosine similarity scores) to determine the multi-embedding score.

$$MBdistance = \frac{\sum_{i=1}^{3} \text{cosine similarity}_i}{3} = \frac{0.92 + 0.88 + 0.90}{3} = 0.90$$

Aggregation

The aggregation module 308*h* may obtain each of the hallucination scores and combine them in any suitable manner to generate a confidence score. The hallucination scores can include (i) a probabilistic score using the query classification technique, (ii) a factual validation score using the numerical and factual evaluation, (iii) a semantic context matching score using the semantic context matching technique, (iv) a chunk relatedness score using the chunk relatedness assessment, (v) a query-response distance score using the query-response distance evaluation, (vi) a RAGAs score using the RAGAs technique, and (vii) a multi-embedding score using the multi-embedding robustness technique.

In some embodiments, the aggregation module 308*h* may use a weighted average to determine the confidence score. For example, the aggregation module 308*h* may apply higher weights to certain hallucination evaluation techniques and lower weights to other hallucination evaluation techniques. The formula to determine the confidence score (CS) may be:

$$CS = \frac{w_1\,\text{Class} + w_2 FVS + w_3 SCMS + w_3 CRS + w_4 QRDS + w_5 RAGAS_{score} + w_6 \overline{MBdistance}}{w_1 + w_2 + w_3 + w_4 + w_5 + w_6}$$

where $w_i$ indicates a weight assigned to the $i^{th}$ hallucination evaluation technique, Class represents the probabilistic score, FVS represents the factual validation score, SCMS represents the semantic context matching score, CRS represents the chunk relatedness score, QRDS represents the query-response distance score, $RAGAS_{score}$ represents the RAGAs score, and MBdistance represents the multi-embedding score.

In some embodiments, the aggregation module 308*h* may train a probabilistic model to determine weights for the hallucination scores, for example based on hallucination scores for responses with known confidence scores. For example, confidence scores for certain response/query combinations may be manually assigned and used to train the probabilistic model. The probabilistic model may be represented as $$p(x) = \frac{1}{1 + e^{-1(\beta_0 + \beta_1 Class + \beta_2 FVS + \beta_3 CRS + \beta_4 QRDS + \beta_5 RAGAS_{score} + \beta_6 \overline{MBdistance})}}$$

where $\beta_i$ represents a weight assigned to the $i^{th}$ hallucination evaluation technique, Class represents the probabilistic score, FVS represents the factual validation score, SCMS represents the semantic context matching score, CRS represents the chunk relatedness score, QRDS represents the query-response distance score, $RAGAS_{score}$ represents the RAGAs score, and MBdistance represents the multi-embedding score. Upon training the probabilistic model, the aggregation module 308*h* can use the probabilistic model to determine the confidence score.

The aggregation module 308*h* may then provide an indication of the confidence score to a client device 106-116 for display. For example, the aggregation module 308*h* may provide an indication of the confidence score to the client device 106-116 that generated the query. The client device 106-116 may then display the response along with the confidence score so that the user can see how reliable the response is. The aggregation module 308*h* may provide the confidence score as a numerical score for display to the user. In other embodiments, the aggregation module 308*h* may categorize the confidence score by comparing the confidence score to one or more thresholds. For example, if the confidence score is above a first threshold (0.85), the aggregation module 308*h* may categorize the confidence score as high. If the confidence score is at or below the first threshold but above a second threshold (e.g., between 0.7 and 0.85), the aggregation module 308*h* may categorize the confidence score as medium. Alternatively, if the confidence score is at or below the second threshold (e.g., below 0.7), the aggregation module 308*h* may categorize the confidence score as low. Then the aggregation module may provide the confidence score category (high confidence, medium confidence, or low confidence) for display to the user.

In some embodiments, if the confidence score is above or equal to a threshold score (e.g., the first threshold), the aggregation module 308*h* may determine the response is reliable. However, if the aggregation module 308*h* determines that the confidence score is below a threshold score (e.g., the second threshold), the aggregation module 308*h* may provide the query to the language model of the language model server 202 to reevaluate the query and generate a new response.

In some embodiments, the language model server 202 may train its language model using the confidence score generated by the hallucination detection server 302. For example, if the language model generates a response having a low confidence score, the hallucination detection server 302 can notify the language model server 202 of the low confidence score. The language model server 202 may use the confidence score for reinforcement learning. For example, higher confidence scores may correspond to higher reward signals and lower confidence scores may correspond to lower reward signals. By providing a lower confidence score, the language model receives a lower reward which causes the language model to adjust to maximize the reward the language model receives for subsequently generated machine learning outputs.

Also in some embodiments, different modules representing different hallucination techniques may run in parallel to compute hallucination scores. For example, the hallucination detection server 302 may determine the probabilistic score using the query classification module 308*a* while determining the factual validation score using the semantic context matching module 308*c*.

In further embodiments, the aggregation module 308*h* may determine that one of the hallucination scores (e.g., probabilistic score) is above a hallucination score threshold. In response to determining that the hallucination score is above the hallucination score threshold, the aggregation module 308*h* may determine the confidence score based on the single hallucination score, and may stop computing other hallucination scores. For example, if one of the hallucination scores is extremely high (~1), the hallucination detection server 302 may not determine any of the other hallucination scores. Instead, the hallucination detection server 302 may generate a confidence score indicating the response is reliable without having to perform the other hallucination evaluation techniques.

The networking interface 306 may enable the hallucination detection server 302 to communicate with other devices, and/or any other suitable devices or combinations thereof. The networking interface 306 may support wired or wireless communications, such as USB, Bluetooth, Wi-Fi Direct, Near Field Communication (NFC), etc. The networking interface 306 may enable the hallucination detection server 302 to communicate via a wireless communication network such as a fifth-, fourth-, or third-generation cellular network (5G, 4G, or 3G, respectively), a Wi-Fi network (802.11 standards), a WiMAX network, or any other suitable wide area network (WAN), local area network (LAN), or personal area network (PAN), etc. Moreover, the network may be a single communication network, or may include multiple communication networks of one or more types (e.g., one or more wired and/or PANs or LANs, and/or one or more WANs such as the Internet).

More generally, the one or more processors 304 may include any suitable number of processors and/or processor types. For example, the processors 304 may include one or more CPUs and one or more graphics processing units (GPUs). Generally, each of the processors 304 may be configured to execute software instructions stored in the corresponding one or more memories 308. The memories 308 may include one or more persistent memories (e.g., a hard drive and/or solid-state memory) and may store one or more applications, modules, and/or models, such as the query classification module 308*a*, numerical and factual evaluation module 308*b*, semantic context matching module 308*c*, etc.

Figure 4:
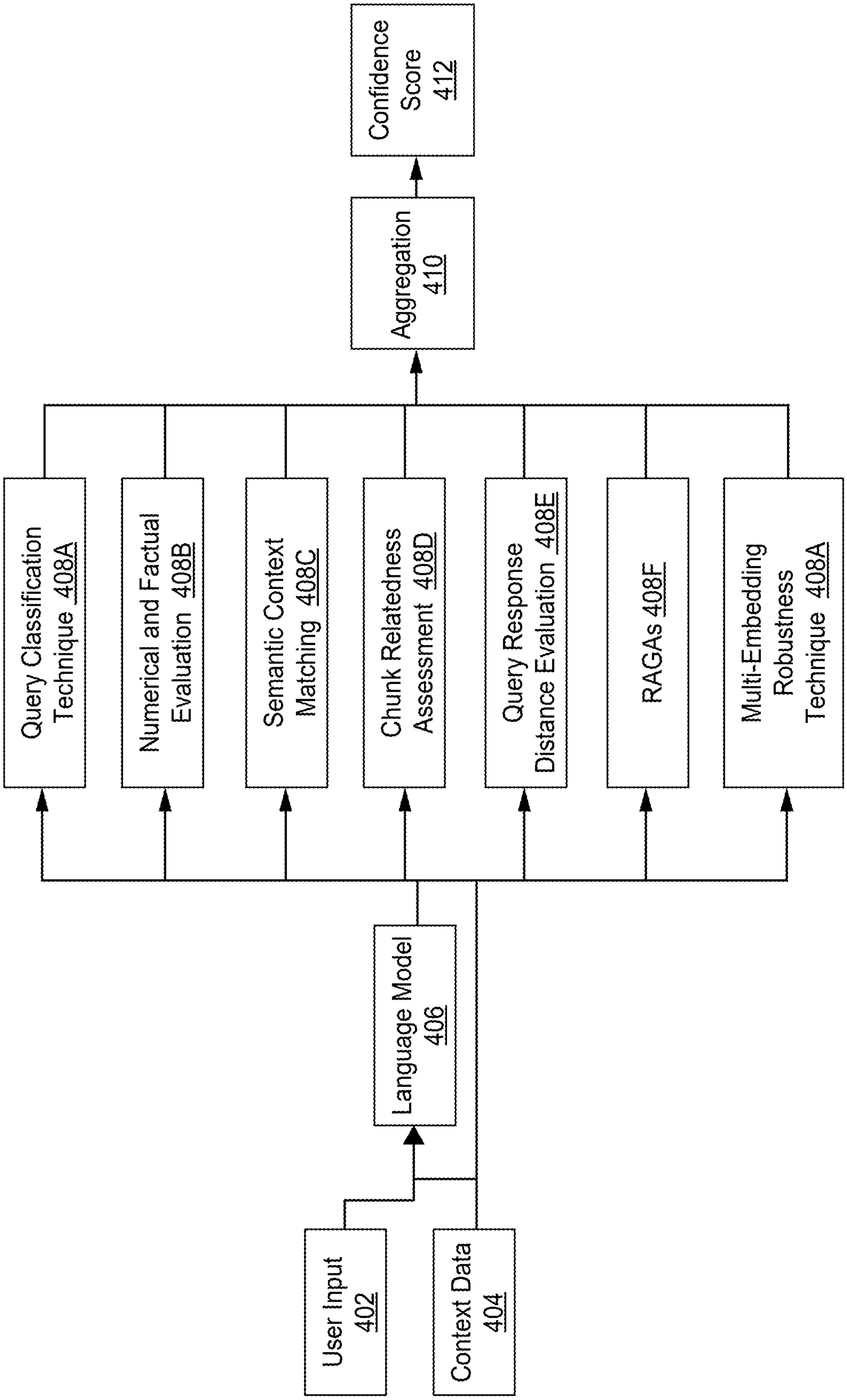
FIG. 4 illustrates a combined block and logic diagram that depicts the generation of a confidence score used to evaluate the reliability of a response from a language model.

FIG. 4 illustrates a block diagram that outlines how different components of the language model server 202 and the hallucination detection server 302 interact with each other to provide a confidence score for a response. The block diagram include a user input 402, context data 404, a language model 406, an aggregation 410, a confidence score 412, and hallucination evaluation techniques including a query classification technique 408A, a numerical and factual evaluation 408B, a semantic context matching 408*c*, a chunk relatedness assessment 408D, a query-response distance evaluation 408E, a RAGAs 408F, and a multi-embedding robustness technique 408G.

The user input 402 may include a user's query. The user's query can be a direct question seeking specific information, a command requesting an action, etc. The language model 406 may generate a response to the user's query. The context data 404 may be obtained from predefined corpus (e.g., collection of texts or resources that can be used as a reference for different tasks) that is used to support the generation of the response by the language model server 202, or to verify the generated response by the hallucination detection server 302.

A user using a client device, such as client devices 106-116 of FIG. 1, may input the user input 402 to a language model 406. The language model 406 may generate the response to the user input 402, for example using the context data 404. The language model 406, upon generating the response, may send the query and the response to the hallucination evaluation modules 408A-G to evaluate the reliability of the response.

The hallucination detection server 302 may apply each of the hallucination evaluation techniques 408A-408G in parallel. This parallel processing approach allows the server to efficiently evaluate each technique simultaneously, thereby speeding up the detection process. By running these evaluations concurrently, the hallucination detection server 302 can quickly determine hallucination scores for the hallucination evaluation techniques.

In response to generating each of the hallucination scores, the hallucination detection server 302 may perform an aggregation 410 to combine the hallucination scores generated by the hallucination evaluation techniques 408A-408H. The aggregation 410 may be an average of the hallucination scores to determine the confidence score 412. In other implementations, the aggregation 410 may be a weighted average of the hallucination scores to determine the confidence score 412. For example, certain hallucination scores may be weighted more than other hallucination scores to determine the confidence score 412.

In some embodiments, the aggregation 410 may be performed using a linear model to determine the confidence score 412. The hallucination detection server 302 may train the linear model using hallucination scores and confidence scores for prior responses to determine weights assigned to the hallucination scores in the linear model that best determine whether the response includes a hallucination. The hallucination detection server 302, upon training the linear model, may use the linear model to determine the confidence score 412.

In some other embodiments, the hallucination detection server 302 may determine that one of the hallucination scores is above a hallucination score threshold. The hallucination detection server 302 may then determine the confidence score 412 without performing the remaining hallucination evaluation techniques. For example, if a query classification technique 408A determines a probabilistic score that is above a hallucination score threshold, then the hallucination detection server 302 may no longer need to consider other hallucination scores to determine the confidence score 412. This approach can help reduce latency in evaluating the response, as the hallucination detection server 302 may no longer need to perform the remaining hallucination evaluation techniques to determine the confidence score.

FIG. 5 illustrates an example data table including for multiple responses 504, hallucination scores using multiple hallucination evaluation techniques, a confidence score for the response, and an indication of the reliability of the response. The example data table may include a query 502, a response 504, a probability score from a query classification technique (QCT) 506, a factual validation score from a numerical and factual evaluation (NFE) 508, a semantic context matching score from a semantic context matching (SCM) 510, a chunk relatedness score from a chunk relatedness assessment (CRA) 512, a query-response distance score from a query-response distance evaluation (QRDE) 514, a RAGAs score from a RAGAs 516, a multi-embedding score from a multi-embedding robustness technique (MERT) 518, a confidence score 520, and an indication of reliability 522. A confidence score greater than 0.85 may indicate high reliability, a confidence score less than or equal to 0.85 and greater than 0.70 may indicate medium reliability, and a confidence score less than or equal to 0.70 may indicate low reliability. A hallucination score threshold may be 0.9 which may apply to all of the hallucination evaluation techniques.

In row 530, the query "What is the capital of France?" generates the response "The capital of France is Paris." A hallucination detection server 302 may analyze the query, the response, and context (not shown) to determine a probability score of 0.6, a factual validation score of 0.95, a semantic context matching score of 0.7, a chunk relatedness score of 0.55, a query-response distance score of 0.8, a RAGAs score of 0.75, and a multi-embedding score of 0.72. Since the factual validation score is above the hallucination score threshold, upon generating the factual validation score of 0.95, other remaining hallucination scores are not needed (although they are shown in row 530) to determine the confidence score. The hallucination detection server 302 may then generate a confidence score of 0.9 based on the factual validation score of 0.95. Since the confidence score is greater than 0.85, the hallucination detection server may determine that the response in row 530 is highly reliable.

In row 532, the query "Does a goldfish have a 3-second memory?" generates the response "Goldfish actually have a memory span of months and can learn and remember things quiet well." The hallucination detection server may use the query, the response, and context (not shown) to determine a probability score of 0.65, a factual validation score of 0.71, a semantic context matching score of 0.75, a chunk relatedness score of 0.69, a query-response distance score of 0.81, a RAGAs score of 0.79, and a multi-embedding score of 0.82. The hallucination detection server 302 may apply a trained linear model to the hallucination scores to generate the confidence score of 0.80. Since the confidence score is less than 0.85 but greater than 0.7, the hallucination detection server 302 may determine that the response in row 532 is somewhat (medium) reliable.

In row 534, the query "How many planets are there in our solar system?" generates the response "There are 9 planets in our solar system. They are Earth, Mars, Jupiter, Saturn, Uranus, Neptune, Venus, Mercury, and Pluto." The hallucination detection server 302 may use the query, the response, and context (not shown) to determine a probability score of 0.3, a factual validation score of 0.12, a semantic context matching score of 0.21, a chunk relatedness score of 0.19, a query-response distance score of 0.13, a RAGAs score of 0.21, and a multi-embedding score of 0.14. The hallucination detection server 302 may then average the hallucination scores to generate the confidence score of 0.19. Since the confidence score is less than 0.7, the response in row 334 may be deemed (low) unreliable.

FIG. 6 illustrates an example method 600 for evaluating the reliability of a response generated by a language model. The method can be implemented in a set of instructions stored on a computer-readable memory and executable at one or more processors of a hallucination detection server 302. A language model server 202 may include the language model used to generate the response.

At block 602, the one or more processors obtain a query provided to a language model and a response to the query generated by the language model. A user of a client device (e.g., client devices 106-116) may provide the query to the language model server 202. The language model server 202, upon receiving the query from the client device 106-116, may generate the response to the query using the language model. The language model server 202 may then transmit the query and the response to the hallucination detection server 302 to evaluate the reliability of the response.

At block 604, the one or more processors apply a plurality of hallucination evaluation techniques to one or more of the query and the response to generate a plurality of hallucination scores. The plurality of hallucination evaluation techniques include two or more of (i) a query classification technique, (ii) a numerical and factual evaluation, (iii) semantic context matching, (iv) a chunk relatedness assessment, (v) a query-response distance evaluation, (vi) retrieval augmented generation assessment (RAGAs), and (vii) a multi-embedding robustness technique.

The query classification technique may include obtaining a query classification model trained using a first set of queries that resulted in hallucinations and a second set of queries that did not result in hallucinations. The one or more processors then apply the query to the query classification model to determine a probabilistic score indicating a probability that a response to the query will include a hallucination.

The numerical and factual evaluation includes identifying numerical or factual information within the response including, for each instance of the numerical or factual information in the response, identifying a type of the numerical or factual information and identifying a value for the numerical or factual information. The one or more processors then obtain a known value for each identified type of the numerical or factual information from a database. Finally, the one or more processors compare, for each identified type of numerical or factual information, the value in the response to the known value in the database to determine a factual validation score.

The one semantic context matching includes dividing the response into a plurality of chunks. Next, for each chunk in the plurality of chunks, the one or more processors analyze the chunk to identify a semantic context for the chunk. The one or more processors then compare the semantic contexts for each chunk to the semantic context for the query. Finally, the one or more processors determine a semantic context matching score based on differences between the semantic contexts for each of the plurality of chunks and the semantic context for the query.

The chunk relatedness assessment includes dividing the response into a plurality of chunks. Next, for each of the plurality of chunks, the one or more processors apply a topic modeling algorithm to the chunk to identify a topic for the chunk. For each pair of chunks in the plurality of chunks, the one or more processors determine a topic coherence score for the pair based on the topics. Finally, the one or more processors then determines a chunk relatedness score based on the topic coherences score for each pair of chunks.

The query-response distance evaluation includes converting the query and the response into a query vector and a response vector. The one or more processors then determine a minimum distance between the query vector and the response vector based on the minimum distance required to transform the query vector to the response vector. Finally, the one or more processors then determine a query-response distance score based on the minimum distance.

The RAGAs includes obtaining a context for the query. Next, the one or more processors determine a faithfulness score based on the number of statements in the response that are supported by the context. The one or more processors then generate one or more potential questions corresponding to the response. Next, the one or more processors determines a relevance score based on one or more differences between the one or more potential questions and the query. The one or more processors then extract a number of sentences from the context which are relevant to the query. Next, the one or more processors determine a context relevance score based on the number of relevant sentences compared to a total number of sentences in the context. Finally, the one or more processors then determines a RAGAs score based on the faithfulness score, the relevance score, and the context relevance score.

The multi-embedding robustness technique includes obtaining a context for the query. For each word embedding model of a plurality of word embedding models, the one or more processors convert the context and the response into a context vector and a response vector using the word embedding model, and determine a difference between the context vector and the response vector using the word embedding model. Finally, the one or more processors then combine the differences between the context vectors and the response vectors obtained from each word embedding model to generate a multi-embedding score.

At block 606, the one or more processors combine the plurality of hallucination scores to obtain a confidence score. The one or more processors combine the plurality of hallucination scores to obtain the confidence score by combining (i) a probabilistic score using the query classification technique, (ii) a factual validation score using the numerical and factual evaluation, (iii) a semantic context matching score using the semantic context matching technique, (iv) a chunk relatedness score using the chunk relatedness assessment, (v) a query-response distance score using the query-response distance evaluation, (vi) a RAGAs score using the RAGAS technique, and (vii) a multi-embedding score using the multi-embedding robustness technique. In some embodiments, the one or more processors combine the plurality of hallucination scores to obtain the confidence score by applying the plurality of hallucination scores to a probabilistic model to obtain the confidence score.

In some other embodiments, the one or more processors determine that one of the plurality of hallucination scores is above a hallucination score threshold. The one or more processors, in response to determining that the hallucination score is above the hallucination score threshold, determine the confidence score without performing remaining hallucination evaluation techniques of the plurality of hallucination evaluation techniques.

At block 608, the one or more processors provide an indication of the confidence score for display on a user interface. The confidence score indicates the reliability of the response. The one or more processors may determine whether the confidence score is below or above a threshold score. If the confidence score is below the threshold score, the response may be determined unreliable, and the one or more processors may provide the query to the language model for the language model to reevaluate the query and generate a new response. In some embodiments, the language model may be further trained using the confidence score.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for evaluating reliability of a response generated by a language model through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for evaluating reliability of a response generated by a language model, the method comprising:

obtaining, by one or more processors, a query provided to a language model and a response to the query generated by the language model;

applying, by the one or more processors, a plurality of hallucination evaluation techniques to one or more of the query and the response to generate a plurality of hallucination scores including a different hallucination score for each of the plurality of hallucination evaluation techniques, wherein the plurality of hallucination evaluation techniques include (i) at least one preventative measure that preventatively checks a hallucination risk of the query based on a probability that the query will result in a hallucination, and (ii) at least one detective measure that checks a hallucination risk of the response;

combining, by the one or more processors, the plurality of hallucination scores to obtain a confidence score; and providing, by the one or more processors, an indication of the confidence score for display on a user interface, wherein the confidence score indicates the reliability of the response.

2. The method of claim 1, wherein the plurality of hallucination evaluation techniques include two or more of:

(i) a query classification technique, (ii) a numerical and factual evaluation, (iii) semantic context matching, (iv) a chunk relatedness assessment, (v) a query-response distance evaluation, (vi) retrieval augmented generation assessment (RAGAs), and (vii) a multi-embedding robustness technique.

3. The method of claim 2, wherein applying the query classification technique includes:

training, by the one or more processors, a query classification model using a first set of queries that resulted in hallucinations and a second set of queries that did not result in hallucinations; and applying, by the one or more processors, the query to the query classification model to determine a probabilistic score based on a probability of the response to the query having a hallucination.

4. The method of claim 2, wherein applying the numerical and factual evaluation includes:

identifying, by the one or more processors, numerical or factual information within the response including, for each instance of the numerical or factual information in the response, identifying a type of the numerical or factual information and identifying a first value for the numerical or factual information;

obtaining, by the one or more processors, a second value for each identified type of the numerical or factual information from a database; and comparing, by the one or more processors, for each identified type of the numerical or factual information, the first value in the response to the second value in the database to determine a factual validation score.

5. The method of claim 2, wherein applying the semantic context matching includes:

dividing, by the one or more processors, the response into a plurality of chunks;

for each chunk in the plurality of chunks, analyzing, by the one or more processors, the chunk to identify a semantic context for the chunk;

analyzing, by the one or more processors, the query to identify a semantic context for the query;

comparing, by the one or more processors, the semantic contexts for each chunk to the semantic context for the query; and determining, by the one or more processors, a semantic context matching score based on differences between the semantic contexts for each of the plurality of chunks and the semantic context for the query.

6. The method of claim 2, wherein applying the chunk relatedness assessment includes:

dividing, by the one or more processors, the response into a plurality of chunks;

for each of the plurality of chunks, applying, by the one or more processors, a topic modeling algorithm to the chunk to identify a topic for the chunk;

for each pair of chunks in the plurality of chunks, determining, by the one or more processors, a topic coherence score for the pair based on the topics; and determining, by the one or more processors, a chunk relatedness score based on the topic coherences score for each pair of chunks.

7. The method of claim 2, wherein applying the query-response distance evaluation includes:

converting, by the one or more processors, the query and the response into a query vector and a response vector;

determining, by the one or more processors, a minimum distance between the query vector and the response vector based on the minimum distance required to transform the query vector to the response vector; and determining, by the one or more processors, a query-response distance score based on the minimum distance.

8. The method of claim 2, wherein applying the RAGAs includes:

obtaining, by the one or more processors, a context for the query;

determining, by the one or more processors, a faithfulness score based on a number of statements in the response that are supported by the context;

generating, by the one or more processors, one or more potential questions corresponding to the response;

determining, by the one or more processors, a relevance score based on one or more differences between the one or more potential questions and the query;

extracting, by the one or more processors, a number of relevant sentences from the context which are relevant to the query;

determining, by the one or more processors, a context relevance score based on the number of relevant sentences compared to a total number of sentences in the context; and determining, by the one or more processors, a RAGAs score based on the faithfulness score, the relevance score, and the context relevance score.

9. The method of claim 2, wherein applying the multi-embedding robustness technique includes:

obtaining, by the one or more processors, a context for the query;

for each word embedding model of a plurality of word embedding models:

converting, by the one or more processors, the context and the response into a context vector and a response vector using the word embedding model; and determining, by the one or more processors, a difference between the context vector and the response vector using the word embedding model; and combining, by the one or more processors, the differences between the context vectors and the response vectors obtained from each word embedding model to generate a multi-embedding score.

10. The method of claim 2, wherein combining the plurality of hallucination scores to obtain the confidence score includes:

combining, by the one or more processors, (i) a probabilistic score using the query classification technique, (ii) a factual validation score using the numerical and factual evaluation, (iii) a semantic context matching score using the semantic context matching technique, (iv) a chunk relatedness score using the chunk relatedness assessment, (v) a query-response distance score using the query-response distance evaluation, (vi) a RAGAs score using the RAGAs technique, and (vii) a multi-embedding score using the multi-embedding robustness technique.

11. The method of claim 1, further comprising:

determining, by the one or more processors, that one of the plurality of hallucination scores is above a hallucination score threshold; and in response to determining that the hallucination score is above the hallucination score threshold, determining, by the one or more processors, the confidence score without performing remaining hallucination evaluation techniques of the plurality of hallucination evaluation techniques.

12. The method of claim 1, further comprising:

in response to determining that the confidence score is below a threshold score, providing, by the one or more processors, the query to the language model for the language model to reevaluate the query and generate a new response.

13. The method of claim 1, further comprising:

training, by the one or more processors, the language model using the confidence score.

14. A computer system for evaluating reliability of a response generated by a language model comprising:

one or more processors, and a non-transitory program memory coupled to the one or more processors and storing executable instructions that, when executed by the one or more processors, causes the computer system to:

obtain a query provided to the language model and the response to the query generated by the language model;

apply a plurality of hallucination evaluation techniques to one or more of the query and the response to generate a plurality of hallucination scores including a different hallucination score for each of the plurality of hallucination evaluation techniques, wherein the plurality of hallucination evaluation techniques include (i) at least one preventative measure that preventatively checks a hallucination risk of the query based on a probability that the query will result in a hallucination, and (ii) at least one detective measure that checks a hallucination risk of the response;

combine the plurality of hallucination scores to obtain a confidence score; and provide an indication of the confidence score for display on a user interface, wherein the confidence score indicates the reliability of the response.

15. The computer system of claim 14, wherein the plurality of hallucination evaluation techniques includes two or more of:

(i) a query classification technique, (ii) a numerical and factual evaluation, (iii) semantic context matching, (iv) a chunk relatedness assessment, (v) a query-response distance evaluation, (vi) retrieval augmented generation assessment (RAGAs), and (vii) a multi-embedding robustness technique.

16. The computer system of claim 14, wherein the instructions, when executed by the one or more processors, further cause the computer system to:

determine that one of the plurality of hallucination scores is above a hallucination score threshold; and in response to determining that the hallucination score is above the hallucination score threshold, determine the confidence score without performing remaining hallucination evaluation techniques of the plurality of hallucination evaluation techniques.

17. The computer system of claim 14, wherein the instructions, when executed by the one or more processors, further cause the computer system to:

in response to determining that the confidence score is below a threshold score, provide the query to the language model for the language model to reevaluate the query and generate a new response.

18. The computer system of claim 14, wherein the instructions, when executed by the one or more processors, further cause the computer system to:

train the language model using the confidence score.

19. A non-transitory computer-readable medium storing executable instructions for evaluating reliability of a response generated by a language model, the instructions, when executed by one or more processors, cause the one or more processors to:

obtain a query provided to the language model and the response to the query generated by the language model;

apply a plurality of hallucination evaluation techniques to one or more of the query and the response to generate a plurality of hallucination scores including a different hallucination score for each of the plurality of hallucination evaluation techniques, wherein the plurality of hallucination evaluation techniques include (i) at least one preventative measure that preventatively checks a hallucination risk of the query based on a probability that the query will result in a hallucination, and (ii) at least one detective measure that checks a hallucination risk of the response;

combine the plurality of hallucination scores to obtain a confidence score; and provide an indication of the confidence score for display on a user interface, wherein the confidence score indicates the reliability of the response.

* * * * *